United States Patent
Sychev et al.

(10) Patent No.: US 12,184,863 B2
(45) Date of Patent: Dec. 31, 2024

(54) MOTION COMPENSATION WITH A SPARSE OPTICAL FLOW REPRESENTATION

(71) Applicant: HUAWEI TECHNOLOGIES CO., LTD., Shenzhen (CN)

(72) Inventors: Maxim Borisovitch Sychev, Moscow (RU); Elena Alexandrovna Alshina, Munich (DE); Mikhail Vyacheslavovich Sosulnikov, Munich (DE); Alexander Alexandrovich Karabutov, Moscow (RU)

(73) Assignee: Huawei Technologies Co., Ltd, Shenzhen (CN)

( * ) Notice: Subject to any disclaimer, the term of this patent is extended or adjusted under 35 U.S.C. 154(b) by 91 days.

(21) Appl. No.: 18/145,569

(22) Filed: Dec. 22, 2022

(65) Prior Publication Data

US 2023/0128496 A1    Apr. 27, 2023

Related U.S. Application Data

(63) Continuation of application No. PCT/RU2021/050104, filed on Apr. 21, 2021.

(30) Foreign Application Priority Data

Jun. 22, 2020    (WO) ................ PCT/RU2020/000302

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/172* (2014.11)

(58) Field of Classification Search
None
See application file for complete search history.

(56) References Cited

U.S. PATENT DOCUMENTS

| 5,241,608 A * | 8/1993 | Fogel | G06T 7/207 |
| | | | 375/240.12 |
| 9,008,363 B1 * | 4/2015 | Klier | G06T 7/269 |
| | | | 382/103 |

(Continued)

FOREIGN PATENT DOCUMENTS

WO    2019093916 A1    5/2019

OTHER PUBLICATIONS

Eggert et al., "Layered Motion Segmentation with a Competitive Recurrent Network," Artificial Neural Networks—ICANN 2010, Part II, LNCS 6353, XP019152419, pp. 124-133, Springer-Verlag Berlin Heldelberg 2010 (Sep. 2010).

(Continued)

*Primary Examiner* — Stefan Gadomski
(74) *Attorney, Agent, or Firm* — Leydig, Voit & Mayer, Ltd.

(57) ABSTRACT

Methods and apparatuses are provided for estimating motion vectors of a dense motion field based on subsampled sparse motion field. The sparse motion field includes two or more motion vectors with their respective start positions. For each of the motion vectors, a transformation is derived which transforms the motion vector from its start point into a target point. The transformed motion vectors then contribute to the estimated motion vector on the target position. The contribution of each motion vector is weighted. Such motion estimation may be readily used for video encoding and decoding.

15 Claims, 16 Drawing Sheets

(51) Int. Cl.
*H04N 19/132* (2014.01)
*H04N 19/172* (2014.01)

(56) References Cited

U.S. PATENT DOCUMENTS

| | | | | |
|---|---|---|---|---|
| 9,646,222 | B1* | 5/2017 | Conway | G06V 10/25 |
| 2007/0154103 | A1* | 7/2007 | Au | H04N 19/523 |
| | | | | 382/236 |
| 2014/0049607 | A1* | 2/2014 | Amon | H04N 19/182 |
| | | | | 348/43 |
| 2015/0242700 | A1* | 8/2015 | Zhang | G06T 7/269 |
| | | | | 382/154 |
| 2020/0193609 | A1* | 6/2020 | Dharur | G06T 7/143 |
| 2021/0360285 | A1* | 11/2021 | Urban | H04N 19/86 |
| 2021/0377553 | A1* | 12/2021 | Galpin | H04N 19/176 |
| 2022/0038681 | A1* | 2/2022 | Galpin | H04N 19/176 |
| 2022/0201328 | A1* | 6/2022 | Galpin | H04N 19/46 |

OTHER PUBLICATIONS

Bross et al., "Versatile Video Coding (Draft 7)," Document of Joint Video Experts Team (JVET) of ITU-T SG 16 WP3 and ISO/IEC JTC 1/SC 29/WG 11, JVET-P2001vE, Total 490 pages (Oct. 1-11, 2019).

Chen et al., "An Overview of Core Coding Tools in the AV1 Video Codec," Picture Coding Symposium (PCS), Total 5 pages (Jun. 2018).

"Test Model of Essential Video Coding (ETM 4.0)," ISO/IEC JTC 1/SC 29/WG 11, MPEG-output document N18775, Total 24 pages (Oct. 2019).

Sullivan et al., "Motion compensation for video compression using control grid interpolation," Acoustics, Speech, and Signal Processing, ICASSP-91, 1991 International Conference, vol. 4, Total 4 pages(Apr. 1991).

Heithausen et al., "Motion compensation with higher order motion models for HEVC," Proceedings of the 2015 IEEE International Conference on Acoustics, Speech and Signal Processing (ICASSP), Brisbane, QLD, Australia, Total 5 pages (Apr. 19-24, 2015).

Heithausen et al., "Improved higher order motion compensation in HEVC with block-to-block translational shift compensation," IEEE DOI 1610, Total 5 pages (2016).

Choi et al., "Design of Efficient Perspective Affine Motion Estimation/Compensation for Versatile Video Coding (VVC) Standard," Electronics (MDPI), vol. 8, 993; https://doi.org/10.3390/electronics8090993, Total 15 pages (Sep. 5, 2019).

* cited by examiner

MOTION COMPENSATION WITH A SPARSE OPTICAL FLOW REPRESENTATION

CROSS-REFERENCE TO RELATED APPLICATIONS

This application is a continuation of International Application No. PCT/RU2021/050104, filed on Apr. 21, 2021, which claims priority to International Patent Application No. PCT/RU2020/000302, filed on Jun. 22, 2020. The disclosures of the aforementioned applications are hereby incorporated by reference in their entireties.

FIELD

The present disclosure generally relates to the field of video processing and, in particular, to motion compensation. Embodiments of the present disclosure provide methods and systems for video processing.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunication networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

In general, image compression may be lossless or lossy. In lossless image compression, the original image can be perfectly reconstructed from the compressed image. However, the compression rates are rather low. In contrast, lossy image compression allows high compression rates with downside of not being able to perfectly reconstruct the original image. Especially when used at low bit rates, lossy image compression introduces visible spatial compression artifacts.

SUMMARY

The present disclosure relates to methods and apparatuses for estimating a motion vector on a given target position.

The invention is defined by the scope of independent claims. Some of the advantageous embodiments are provided in the dependent claims.

Embodiments of the present disclosure provide an efficient way of estimating a motion vector on a given target position from a sparse motion field representation. This is performed by weighting contributing motion vector obtained by at least two different transformations of the motion vectors belonging to the sparse motion field representation.

According to an aspect, a method is provided for estimating a motion vector at a target position, the method comprising: obtaining two or more start positions and two or more motion vectors starting respectively at the two or more start positions; obtaining, for each start position of the two or more start positions, a corresponding transformation for transforming the motion vector starting at said start position to another position; determining two or more contributing motion vectors by transforming each of said two or more motion vectors with the corresponding transformation from said start position to the target position of the corresponding transformation; and estimating the motion vector at the target position including weighted average of the two or more contributing motion vectors.

The method may allow to represent larger areas with a more complex motion model, described with fewer parameters. The parameters may be predicted from an optical flow available on encoder side, instead of a well-known and mainly complex Rate-Distortion Optimization (RDO) approach. Higher amount of sub-sampling may be employed at the encoder when the motion model is simple. More complex motion models may allow to describe the motion within larger areas of the predicted frame, which leads to reduction of signalling overhead.

In some implementations, the non-linear function is a Gaussian distribution function. Such non-linear motion model allows to densify any sparse representation of motion field. For instance, the distance corresponds to the square norm. The square norm is easy to calculate, especially in combination with the Gaussian distribution function. Since Gaussian distribution has a quadratic term of the distance, the square-root calculation which would be otherwise necessary for computing the norm is unnecessary.

According to an embodiment, the obtaining of the corresponding transformation comprises: obtaining motion vector starting at the other position; and estimating parameters of an affine transformation based on affine transforming of the motion vector starting at said start position to the motion vector starting at the other position. Affine transformation may cover a wide spread of motion types typically present in natural videos such as zoom, rotation or translation.

For example, the two or more start positions belongs to a set of Ns start positions with Ns>2, ordered in a predefined order; and for a start position j, $0 \leq j \leq Ns$, the other position is a position j+1 in the predefined order. The ordering of the positions and possibly the motion vectors associated therewith provides for an efficient storage and/or transmission of these side information parameters.

For instance, the weight of a contributing vector depends on the position, within the predefined order, of the starting position of the respective transformed motion vector. In this way, the association of the weights to the positions/motion vectors can be stored or conveyed without explicit signaling.

According to an embodiment, the two or more start positions are sample positions in a segment of an image, wherein the image includes a plurality of segments, wherein the segment is a set of image samples smaller than the image. Applying the motion vector estimation and transformations on the segment basis enables better adaption to the content of the image and may enable for some parallel processing.

In some implementations, the method comprises the step of reconstructing a motion vector field of said segment of image, including estimating a motion vector starting at each (for instance each integer) sample target position P(x,y) of the segment, which do not belong to the two or more start positions for which respective motion vectors are available. This enables reconstructing a dense motion field out of a sparse (subsamples) motion field, which constitutes an approximation of the optical flow. The optical flow may be used for prediction, e.g. in video codecs. It is noted that in addition to estimating a motion vector starting at each position not belonging to the two or more start positions, in some embodiments, the estimation may be also performed for the two or more start positions.

According to an embodiment, the two or more start positions and the two or more motion vectors starting respectively at the two or more start positions are obtained by parsing from a bitstream related to said segment of the image; and the weights applied in the weighted average are determined based on one or more parameters parsed from the bitstream. Provision of these parameters in the bitstream enables communication of these parameters between an encoder and a decoder (of the motion vector field and/or of video images).

Moreover, in some implementations, the two or more start positions within the segment of the image are determined based on a feature of the segment decoded from a bitstream; the two or more motion vectors starting respectively at the two or more start positions are obtained by parsing from the bitstream related to said segment; and the weights applied in the weighted average are determined based on one or more parameters parsed from the bitstream. Providing signaling of side information for specifying the weighting function in the bitstream enables adaption of the weights to the image content, and thus, to a more accurate reconstruction.

For example, the two or more start positions and the two or more motion vectors starting respectively at the two or more start positions are obtained by determining a motion vector field including a motion vector for each (for example, for each integer) sample position of said segment of the image and by subsampling the obtained motion vector field, and/or the weights of the respective contributing motion vectors are determining by rate-distortion optimization or by machine learning.

According to an aspect, a method is provided for decoding of an image, the method comprising: estimating a motion vector at a sample target position according to the above mentioned embodiments and examples; predicting a sample at the target position in the image according to the estimated motion vector and a corresponding reference picture; and reconstructing the sample at the target position based on the prediction. The decoder applying the motion vector estimation may be capable of reconstructing motion vectors for any parts of the image by using few parameters. Thus, efficient rate utilization may be achieved when conveying the parameters to the decoder.

According to an aspect, a method is provided for encoding of an image, the method comprising: estimating a motion vector at a target position according to the above mentioned embodiments and examples; predicting a sample at the target position in the image according to the estimated motion vector and a corresponding reference picture; and encoding the sample at the target position based on the prediction. The encoder applying the motion vector estimation enables for efficient encoding of the motion vector field.

According to an aspect, an apparatus is provided for estimating a motion vector at a target position, the apparatus comprising processing circuitry including: circuitry configured for obtaining two or more start positions and two or more motion vectors starting respectively at the two or more start positions; circuitry configured for obtaining, for each start position of the two or more start positions, a corresponding transformation for transforming the motion vector starting at said start position to another position; circuitry configured for determining two or more contributing motion vectors by transforming each of said two or more motion vectors with the corresponding transformation from said start position to the target position of the corresponding transformation; and circuitry configured for estimating the motion vector at the target position including weighted average of the two or more contributing motion vectors.

According to an aspect, an encoding device is provided for encoding of an image, the device comprising: the apparatus for estimating a motion vector at a target position according to any of the above mentioned embodiments and examples; a sample predictor for predicting a sample at the target position in the image according to the estimated motion vector and a corresponding reference picture; and a bitstream generator for encoding the sample at the target position based on the prediction.

According to an aspect, a decoding device is provided for decoding of an image, the device comprising: the apparatus for estimating a motion vector at a target position according to any of the above mentioned embodiments and examples; a sample predictor for predicting a sample at the target position in the image according to the estimated motion vector and a corresponding reference picture; and a sample reconstructor for reconstructing the sample at the target position based on the prediction.

Moreover, methods corresponding to the steps performed by the processing circuitry as described above, are also provided.

According to an aspect, a computer product is provided comprising a program code for performing the method mentioned above. The computer product may be provided on a non-transitory medium and include instructions which when executed on one or more processors perform the steps on the method.

The above mentioned apparatuses may be embodied on an integrated chip.

Any of the above mentioned embodiments and implementations may be combined.

BRIEF DESCRIPTION OF DRAWINGS

In the following, embodiments are described in more detail with reference to the attached figures and drawings, in which.

DETAILED DESCRIPTION OF THE EMBODIMENTS

Figure 1:
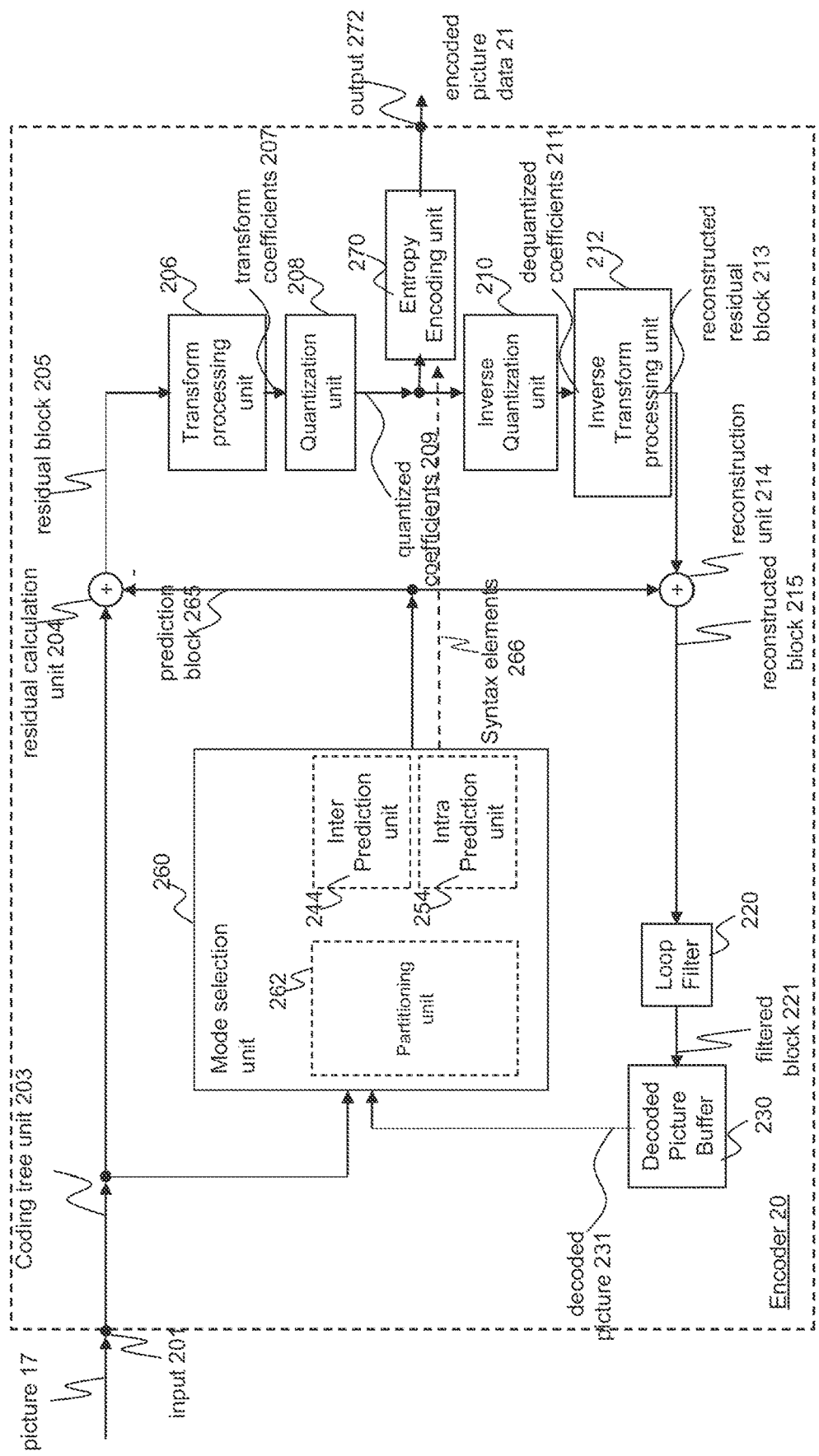
FIG. 1 is a block diagram illustrating an encoding device for encoding video.

In the following description, reference is made to the accompanying figures, which form part of the disclosure, and which show, by way of illustration, aspects of embodiments or aspects in which embodiments may be used. It is understood that embodiments may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

The subsequent section gives explanations of some technical terms referring to at least some of the embodiments used herein.

Reference Frame is a frame (sometimes also referred to as reference picture) that is used as a reference, for instance for the purpose of prediction. This may be inter-prediction, meaning temporal prediction on which some samples of a current frame are predicted based on samples from another frame.

Motion Vector is a vector that specifies the spatial distance of two corresponding points in two different frames, usually denoted as v=[v_x, v_y]. Such motion vector may be a 2D motion vector. However, with 2D motion vector, it is typically assumed that a reference picture (frame) is known. In general, indication of the reference picture (frame) may also be a coordinate of a motion vector, which then can be 3D. Further coordinates may be possible.

Coordinate herein sometimes refers to a position of a pixel (sample) or location of motion vector origin within a picture. It is denoted as p=[px, py].

Motion Field is a set of {p,v} pairs, abbreviated to MF and sometimes referred to as motion vector field (MVF). In other words, motion field is a collection (set) of motion vectors with different origins within a picture.

Optical flow indicates distribution of apparent velocities of movement of brightness pattern in an image (picture, frame). In particular, such optical flow may be represented/indicated by means of a motion field.

Dense Motion Field is a motion field which covers every (such as integer or any samples in the desired sample grid which may also include sub-samples) sample of an image. Here, when storing or transmitting the dense motion field, p is redundant if the dimensions of the image are known, since the motion vectors can be ordered in line-scan order sample per sample (for each p), e.g. scanned from left to right and from top to bottom, or any other way.

Sparse Motion Field is a motion field that does not cover all (such as integer or any samples in the desired sample grid) pixels. Here, knowing p is useful when storing or transmitting the sparse motion field and when the p may vary. It is also possible to have positions p organized in a predetermined pattern (e.g. every fourth sample, or certain grid, or the like), so that the positions do not have to be stored or transmitted.

Sub-sampling is the process of transforming dense data (such as dense motion field) to sparse representation (such as sparse motion field).

Current Frame denotes herein a frame which is to be processed currently (e.g. for which motion vectors or motion field is to be determined, which is to be encoded or decoded or predicted or filtered or otherwise processed or the like). The terms "currently" and "current" generally refer to a part, e.g. frame, currently considered when describing some process or apparatus.

Predicted Frame denotes a frame with samples estimated using already processed (e.g. encoded, decoded, transmitted, received, filtered, etc) information. Such information may be, for example, a reference frame and/or other transmitted side information.

Residual Frame is a difference between predicted frame and current frame. Residual frame may be used, for instance for compensation of prediction error. In particular, the residual frame may be encoded and transmitted to compensate prediction errors, e.g. to be added to the predicted frame at the decoder/receiver side.

Motion Compensation is a term referring to generating a predicted image using a reference image and motion information.

Inter-Prediction is prediction in video coding in which motion information is signalled to the decoder (or derived at the decoder without signalling) such that it can generate a predicted image using previously decoded frames.

Bell-shaped function is the Gaussian distribution (or any similar normal distribution) function. In general terms, it is a function with a quadratic term in the exponent. The term "Bell" refers to the graphical representation of bell-curve.

Known video coders use motion estimation and motion compensation for inter-frame prediction to exploit temporal redundancy. The motion vectors indicate, how the pixels of the reference frame have to be shifted in order to obtain a good prediction for pixels of the current frame. This is typically performed in a block-based manner, which assigns the same motion vector to each pixel of a block. This procedure is often inaccurate and produces blocking artefacts. On the other hand, the number of motion vectors to be transmitted is small.

Figure 2:
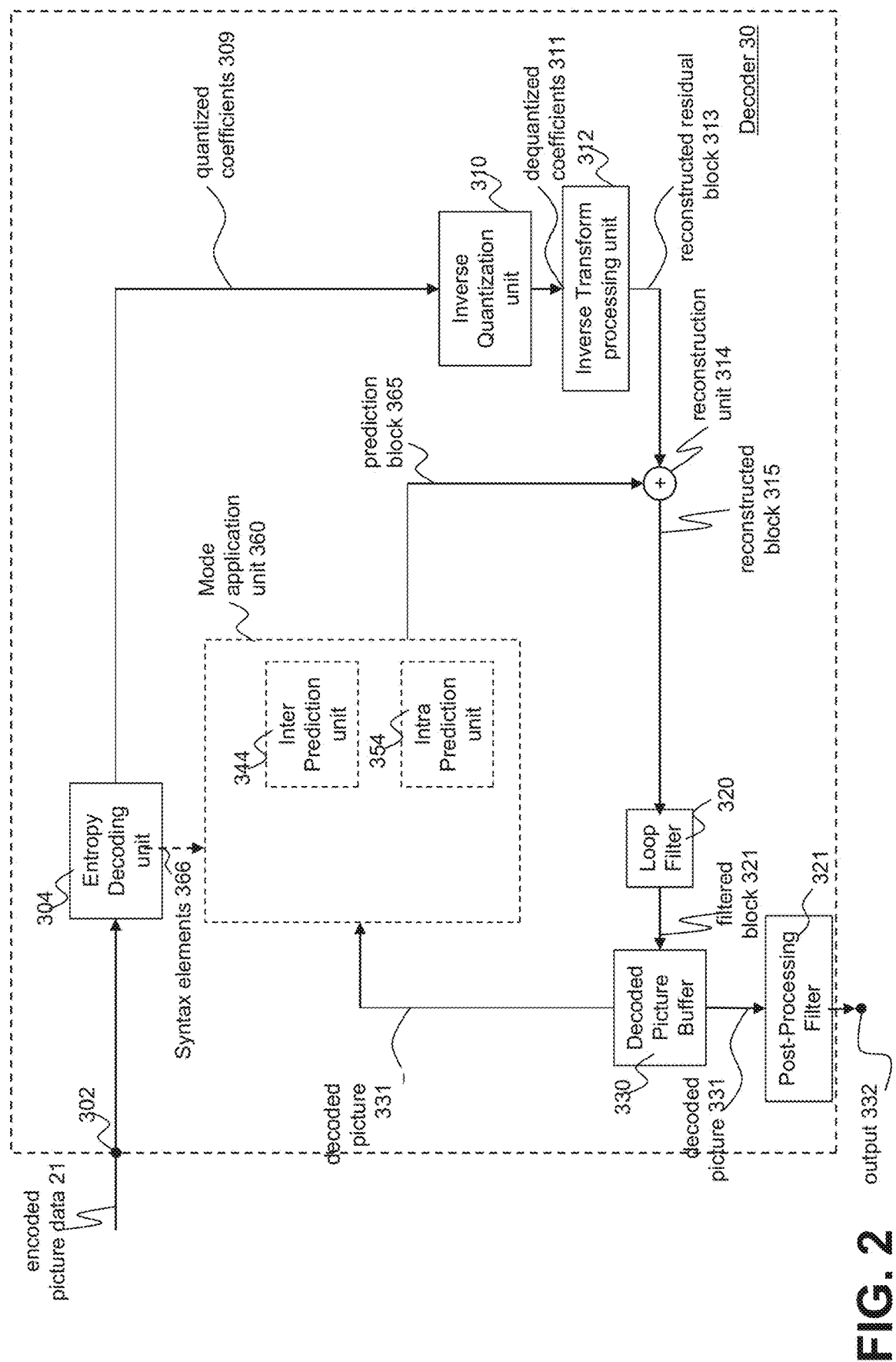
FIG. 2 is a block diagram illustrating a decoding device for decoding video.

FIG. 1 shows a schematic block diagram of an example video encoder 20 that may be also modified or configured to implement the techniques of the present disclosure, as will be explained below and with reference to further figures and embodiments. In the example of FIG. 1, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
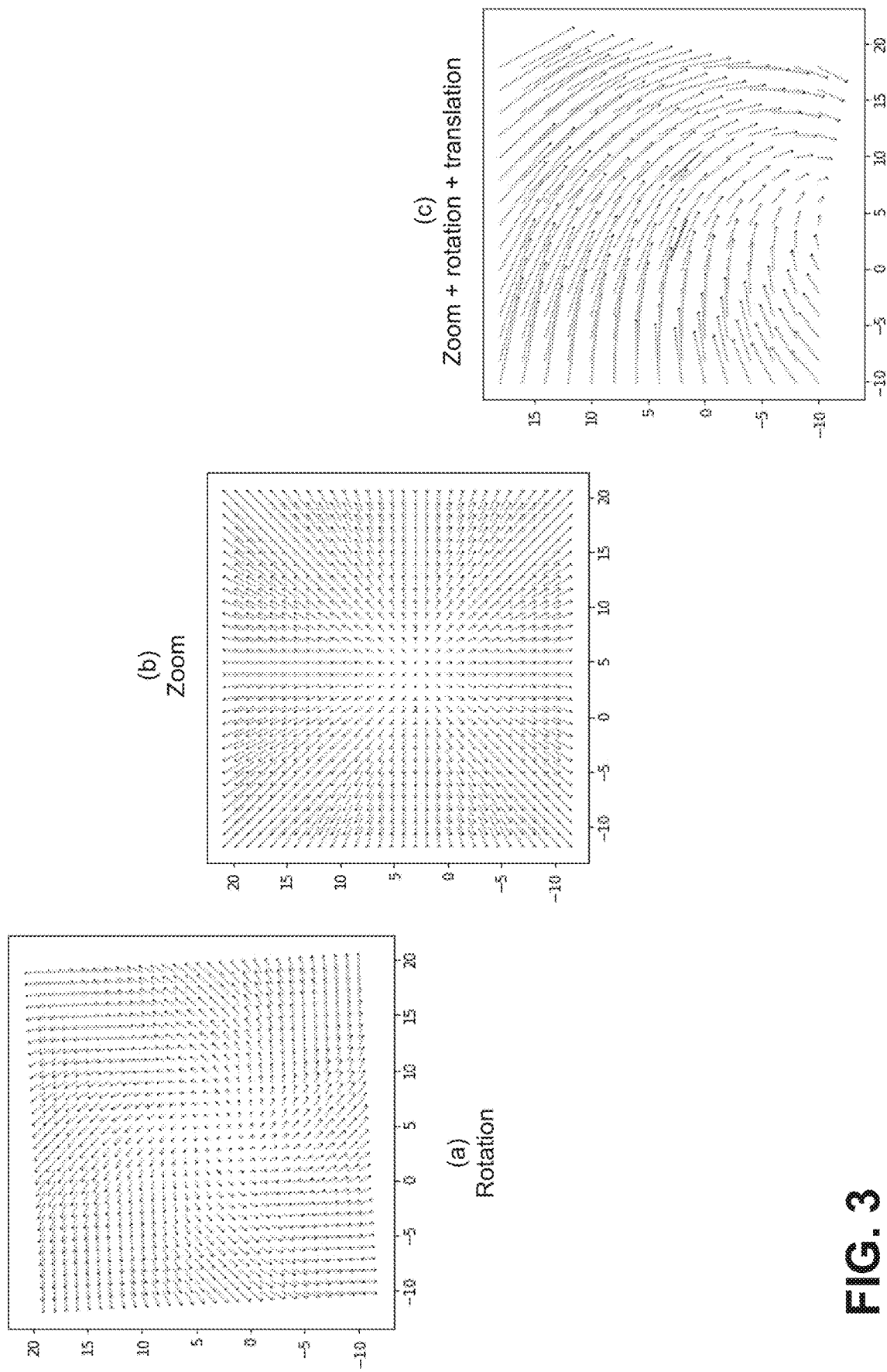
FIG. 3 is a schematic drawing of various motion field transformations.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 1) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients. Embodiments of the video encoder 20 as shown in FIG. 1 may be configured to encode the picture 17 block by block, e.g. the encoding and prediction is performed per block 203.

Embodiments of the video encoder 20 as shown in FIG. 1 may be further configured to partition and/or encode the picture by using slices (also referred to as video slices), wherein a picture may be partitioned into or encoded using one or more slices (typically non-overlapping), and each slice may comprise one or more blocks (e.g. CTUs). Embodiments of the video encoder 20 as shown in FIG. 1 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

The transform processing unit 206 may be configured to apply a transform, e.g. a discrete cosine transform (DCT) or discrete sine transform (DST) or their integer approximations or the like, on the sample values of the residual block 205 to obtain transform coefficients 207 in a transform domain. The transform coefficients 207 may also be referred to as transform residual coefficients and represent the residual block 205 in the transform domain. Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209. The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. The quantization is a lossy operation, wherein the loss increases with increasing quantization step sizes. Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. Although the loop filter unit 220 is shown in FIG. 1 as being an in loop filter, in other configurations, the loop filter unit 220 may be implemented as a post loop filter. The filtered block 221 may also be referred to as filtered reconstructed block 221.

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magneto-resistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time. In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB). For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes. In particular, the mode selection may also include the selection of a prediction mode according to the present disclosure, as will be detailed below with reference to particular embodiments of motion information derivation, representation, and signaling.

The set of intra-prediction modes may comprise, e.g. 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. The intra-prediction unit 254 is configured to use reconstructed samples of neighboring blocks of the same current picture to generate an intra-prediction block 265 according to an intra-prediction mode of the set of intra-prediction modes. The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not. The inter-prediction modes may include a mode operating with the motion field determination and representation as will be described in the following embodiments below. Such mode may be one of a plurality of inter-modes.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV). As will be shown in some detailed embodiment, the motion information in some inter-prediction modes does not have to be provided on a block basis. Motion information may including motion vectors and possibly reference picture, The reference picture is typically signaled separately from the motion vector. However, in general, it can be thought of as a part of a motion vector, e.g. as a third (temporal) component in addition to the two spatial components of the motion vector.

The motion compensation unit is configured to obtain, e.g. receive, an inter prediction parameter and to perform inter prediction based on or using the inter prediction parameter to obtain an inter prediction block 265, or, in general prediction for some samples of the current picture. Motion compensation, performed by the motion compensation unit, may involve fetching or generating the prediction block (prediction samples) based on the motion/block vector determined by motion estimation, possibly performing interpolations to sub-pixel precision. Interpolation filtering may generate additional pixel samples from known pixel samples, thus potentially increasing the number of candidate prediction blocks/samples that may be used to code a picture block. Upon receiving the motion vector for the PU of the current picture block, the motion compensation unit may locate the prediction block to which the motion vector points in one of the reference picture lists. The motion compensation unit may also generate syntax elements associated with the blocks, sample areas, and video slices for use by video decoder 30 in decoding the picture blocks of the video slice. In addition or as an alternative to slices and respective syntax elements, tile groups and/or tiles and respective syntax elements may be generated or used.

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 2 shows an example of a video decoder 30 that may be modified or configured to implement the techniques of this present disclosure. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 2, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 1.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. In some configurations, the loop filter unit 320 may be implemented as a post loop filter.

The decoded video blocks 321 of a picture are then stored in decoded picture buffer 330, which stores the decoded pictures 331 as reference pictures for subsequent motion compensation for other pictures and/or for output respectively display. The decoder 30 is configured to output the decoded picture 311, e.g. via output 312, for presentation or viewing to a user.

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block or sample-based based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 2 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 2 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Some optical flow algorithms generate a dense motion field. This motion field consists of many motion vectors, one for each pixel in the image. Using this motion field for prediction usually yields a much better prediction quality. However, since the dense motion field contains as many motion vectors as the image has pixels, there is no compact representation of the whole field for transmission or storing. Therefore, the dense motion field has to be sub-sampled and quantized in order to reduce the size of data to be transmitted/stored. The decoder then interpolates the missing motion vectors and uses the reconstructed dense motion field for motion compensation.

In most cases the sparse representation of motion field could allow to keep the rate smaller, but it should be supported with some interpolation technique. The field can be sub-sampled in a regular pattern using spatial units/blocks with same areas (like regular grid with uniform distribution of nodes which is used for JPEG image compression for example), which is independent of the content. The interpolation of motion vectors inside such areas is not required—all pixels have the same motion vector and shifted together. This will result in many sampling points which are placed at suboptimal positions. Areas with uniform motion, where only few motion vectors are needed, contain the same number of motion vectors as areas with diverse motion, where many support points are needed. It leads to increasing a bit rate of residual data which is larger than necessary, the latter in an insufficient prediction quality since more motion vectors are needed.

A different approach is to transmit parameters of higher order motion model and only at those positions which are needed for a good reconstruction of the flow field. That way, areas with uniform motion do not need much rate and areas with complex motion are sampled sufficiently dense. However, since only the encoder knows the whole motion field, the positions have to be signalled in some way. When referring herein to transmission or to transmitting, what is meant is in general any kind of conveying the information from the encoder to possible decoder(s). This is typically performed by including side information into the bitstream which is provided together with the encoded data (image/video data).

Some video codecs perform implicit sub-sampling using block-based motion estimation and compensation. Modern codecs like HEVC or VVC, in a way, use content adaptive sampling by applying different block sizes. These codecs explicitly signal the block splits as a quad-tree and ternary tree as exemplified above with reference to FIG. 1 and FIG. 2. It is established, that the increasingly adaptive splitting is responsible for large gains in coding efficiency of the respective codecs. The AVC and HEVC codecs utilize simple translational model, while the recently developed codecs like VVC, EVC and AV1 utilize higher order affine transform up to six parameters per prediction unit (block).

FIG. 3 illustrates a non-translational motion model. In particular, rotation, zoom, and a combination of rotation, zoom and translation is shown (in the figure from left to right). In particular, the three images show a dense motion field for the respective transformations.

Figure 4:
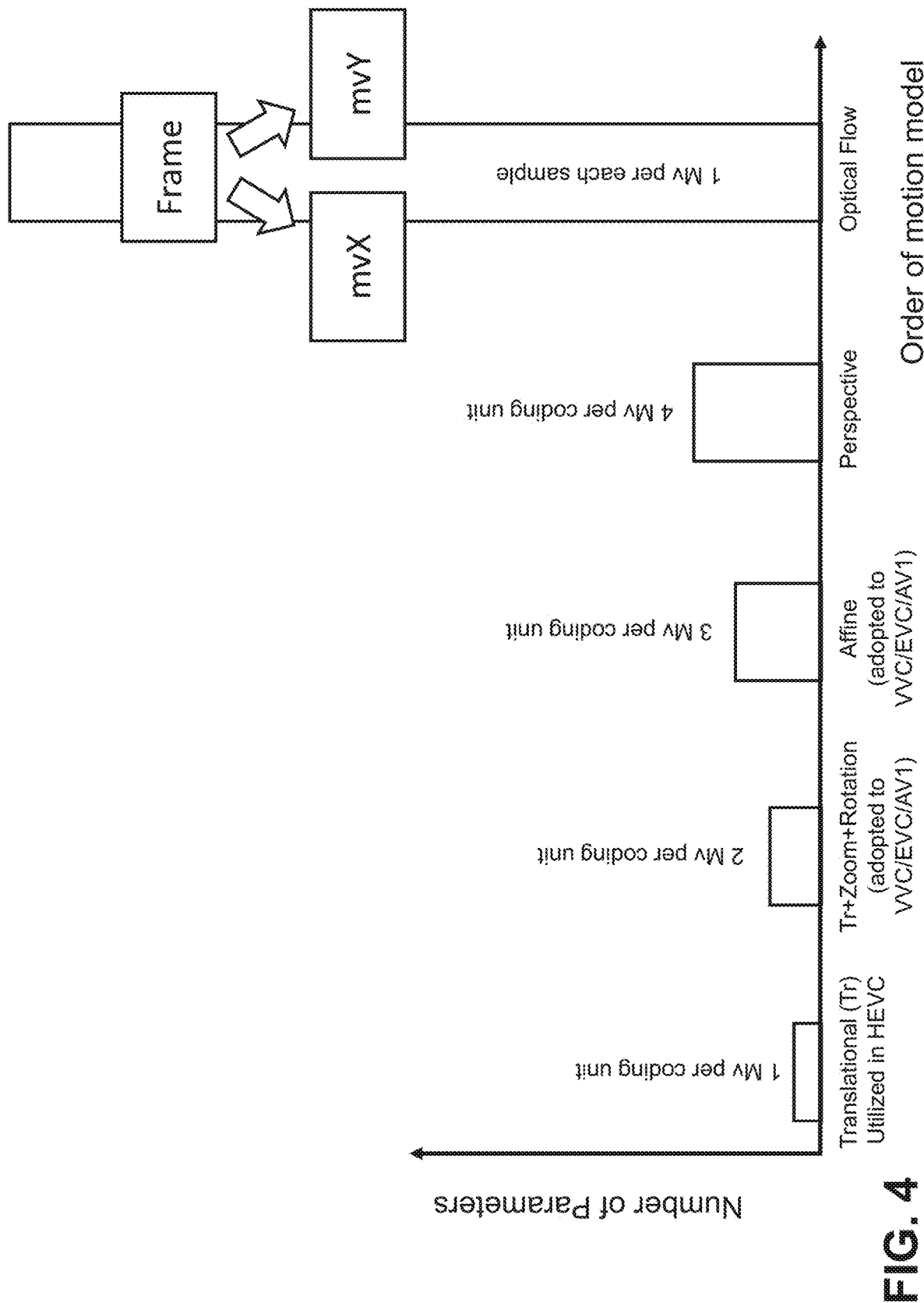
FIG. 4 is a schematic drawing roughly representing comparison between a number of parameters depending on order of the underlying motion model.

It is noted that increasing the order of motion model may lead to reduction of trade-off between rate (signaling of the parameters of motion model) and distortion (reduced due to better prediction by motion compensation). FIG. 4 demonstrates the trend of growing of number of parameters (y axis) to be signalled, with growing of the order of motion model (x axis). The highest amount of representation of motion within frame corresponds to optical flow, and leads to increasing of parameters equal to twice amount of pixels (x and y components of a motion vector in case of 2D motion vector space) in a frame with higher precision (data range for representing MV components). It is noted that FIG. 4 is only schematic illustration to approximately compare the impact of motion accuracy representation on the number of parameters that have to be provided with the encoded video.

Non-block-based motion compensation is rarely used in video coding. The main reason is that the whole motion field has to be transmitted. Natural videos do not imply linear models of motion. Only some areas of frame can typically be described by a simple model, for which the above-mentioned codecs (cf. FIG. 1 and FIG. 2) may be efficient. On the other hand, the more complex non-linear motion models may lead to increasing of the amount of signalling, which is currently used by partitioning, motion model parameters and residual of the corresponding prediction. The existing solutions supporting non-linear motion features of the natural content may require high bitrate overhead for signalling and may, in addition, lead to some blocking artefacts at the block boundaries.

Some embodiments may allow to represent larger areas with a more complex motion model, described with less parameters. The parameters may be readily predicted from an optical flow available on encoder side, instead of a well-known and mainly complex Rate-Distortion Optimization (RDO) approach. Higher amount of sub-sampling may be employed when the motion model is simple. More complex motion models may allow to describe the motion within larger areas of the predicted frame, which leads to reduction of signalling overhead.

In particular, the reconstruction of optical flow is using sparse representation, which is based on a set of affine transformations (transforms). In particular, the affine transformation may be constant shape transformation.

Figure 5:
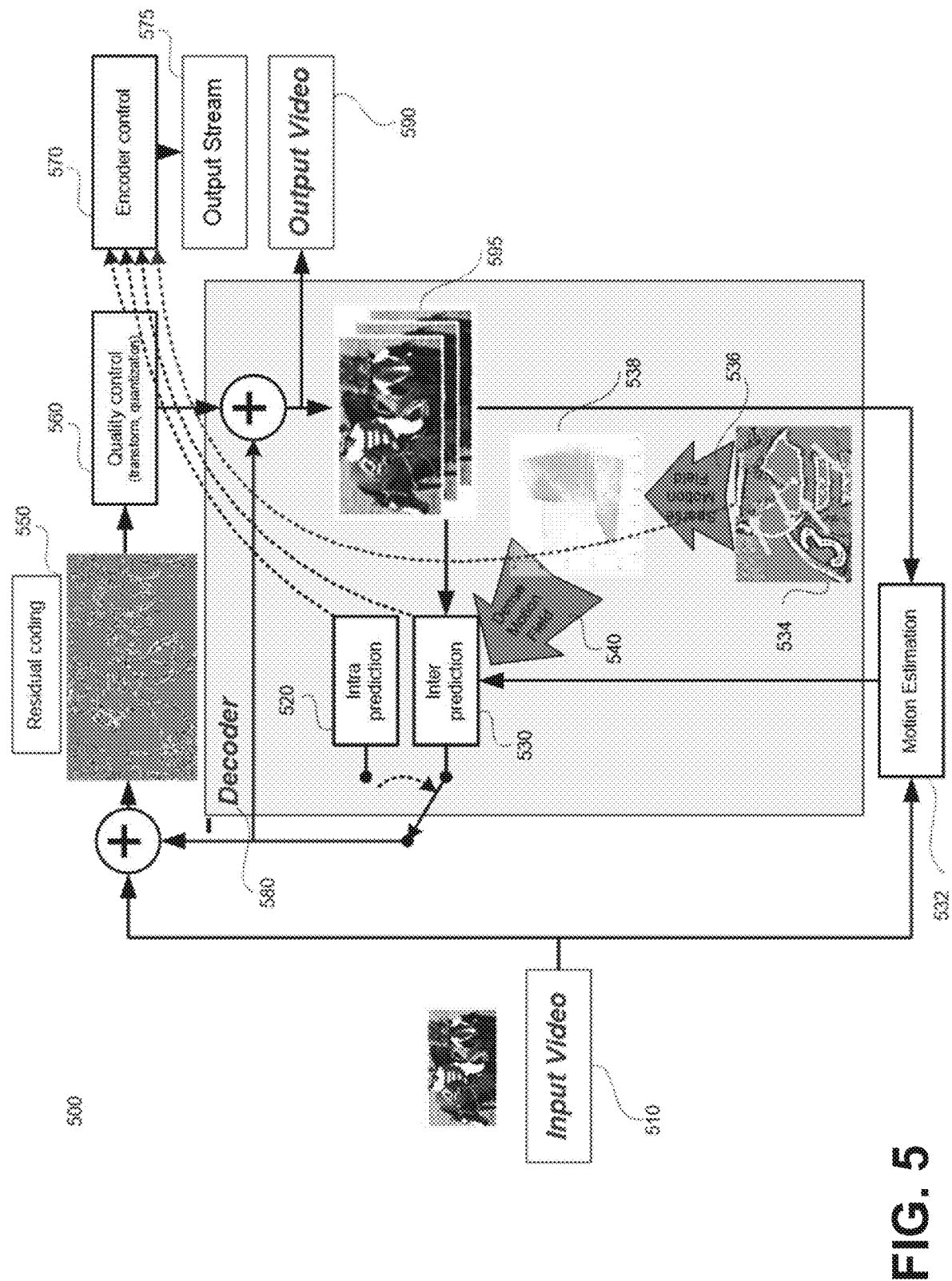
FIG. 5 is a block diagram illustrating a codec (encoder side) which may implement some embodiments.

FIG. 5 shows a block diagram of an encoder illustrating an embodiment of the present disclosure. In this embodiment, a method of densification of a motion field is used as part of motion compensation. The encoder of FIG. 5 has some similarity with the encoder 10 shown in FIG. 1 and discussed above. The motion estimation and motion compensation described herein may be similarly applied to the encoder and to the decoder of FIG. 1 and FIG. 2, for example, as a particular inter-prediction mode.

In FIG. 5, an input video frame 510 (also referred to as the current frame) is predicted using an intra prediction module 520 or an inter prediction module 530. The intra prediction module 520 generates a predicted frame, which is then subtracted from the input video frame 510, thus forming residual signal 550. Moreover, the predicted frame is also used for reconstruction—it is added to reconstructed residuals. Moreover, the intra prediction module 520 generates side information that is passed to an entropy encoder 570, which generates an output (encoded) bitstream 575. The residual frame 550, which corresponds to the difference between the predicted frame and the current frame, passes through a quality control module 560. The quality control module 560 may include transformation (e.g. into spectral domain) and/or quantization. Quantization may perform lossy compression, resulting in some quality degradation. Some further losses may result from other simplifications of the residual signal for compact representation in stream 575.

The inter prediction module 530 includes two sub-modules: Motion Estimation (ME) sub-module 532 and Motion Compensation (MC) sub-module 534-540. The purpose of the ME sub-module 532 is to find the most appropriate parameters of a motion model (defined and used in the video codec) and provide these parameters to the entropy encoder 570 for inclusion into the bitstream as side information. The side information inserted into the bitstream may include various other parameters in general. For example, the side information may carry partitioning/segmentation information, motion vector field 534, and other side information like weighting or other additional control parameters. The purpose of the side information is to convey, to a decoder, parameters which assist the decoder to perform reconstruction. Using parameters of the motion model and reference frame from decoded pictures buffer (DPB) 595, the decoder can reconstruct encoded picture in exactly the same way as it was encoded.

The codec 500 uses a sparse representation of a motion vector field 534 for reducing signalling overhead. This may be achieved, for instance, by using partitioning, subsampling, segmentation with corresponded motion model parameters, or the like. If the amount of parameters of a motion model is higher than with a translational model (e.g. six as used in some known codecs), then interpolation can be used to obtain dense motion field (538, 540) associated with a particular reference frame and corresponded to a prediction frame. In some embodiments of the present disclosure, of densification 538 is used as a part of motion compensation process. The densification 538 which uses sparse representation of a dense motion vector field 534 as an input 536 and provides a dense motion vector field as an output 540 may provide for a suitable motion estimation with a limited number of parameters.

In the following, one particular detailed example of implementing such motion estimation will be described with reference to FIGS. 6 to 11.

Below, parameters are listed, which are known at the encoder as well as the decoder in this implementation. They may be fixed beforehand (predefined, i.e. by standard) or transmitted (conveyed in the bitstream).

$S_s$ Segment with an index s. For example, a picture to be encoded may be segmented into different segments, and each segment may be assigned an index. In general, a segment is any defined set of samples. Segment may be any prediction unit such as a rectangle, a triangle, an ellipse, a hexagon or the like. It is noted that for the purpose of the present disclosure, the segment is not necessarily continuous. Segments that are not connected spatially may be applied. The segments may represent objects. However, it is noted that the present disclosure is applicable also directly to pictures (images) without segmentation.

$N_s$ Number of motion vectors expected at the decoder side for segment with index S. It is noted that the number $N_S$ does not have to depend on S, i.e. it does not have to be segment-specific. For example, it may be defined as N, the same number of motion vectors for all segments.

$P_{s,i}$ Position ($Px_{s,i}$, $Py_{s,i}$) of an $i^{th}$ motion vector of a segment $S_s$, i=0 ... $N_s$.

$MV_{s,i}$ an $i^{th}$ motion vector ($Vx_{s,i}$, $Vy_{s,i}$) of a motion vector list corresponded to segment $S_s$, i=0 ... $N_s$. Here, "corresponded to" means "attributed to" or "associated with".

$w_{s,j}(x, y)$ Weighting function for a $j^{th}$ motion vector pair j=0 ... $N_s-1$. The weighting function may depend on a position (x, y) in the dense motion field. In addition or alternatively, it may depend on the position j in a list of motion vectors (or motion vector pairs) which may be used to derive the weight. The weighting function can be different for mutually different segments. For example, it may depend on the size of the segment, e.g. on the horizontal and/or vertical dimensions or the segment or on the number of image samples per segment.

$a_{s,j}$, $\sigma_{s,j}$, $c_{s,j}$ Parameters of the weighting function. The weighting function is in some embodiments a non-linear function. For example, it can be Gaussian distribution function $$w_{s,j}(x,y) = a_{s,j} \cdot e^{-d_{s,j}(x,y)^2 / 2\sigma_{s,j}^2} + c_{s,j}.$$

It is noted that these parameters are merely an example. The weighting function may have more, or less such parameters.

Figure 6:
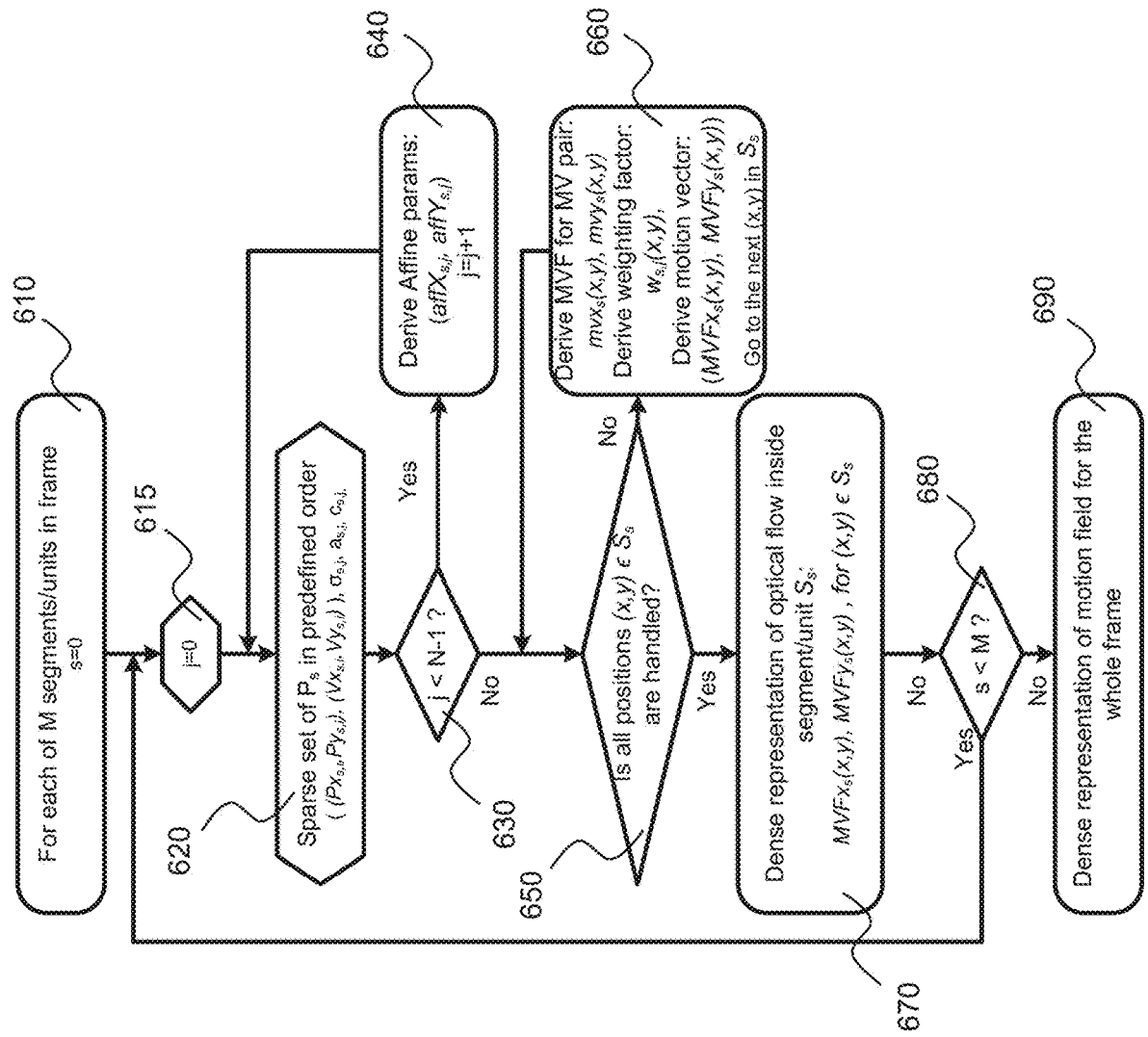
FIG. 6 is a flow chart of a method for estimating motion vectors.

FIG. 6 is a flow diagram illustrating an example of dense motion field estimation on the basis of the above-mentioned parameters.

In step 610, the method is initialized. The method will be performed for each segment $S_S$ among M segments starting with S=0. In step 615, index j is initialized to j=0. In this particular example, the index j goes over $N_S-1$ motion vectors of the current segment (segment with index S being processed).

Steps 620-640, constitute a loop with index j, over motion vectors of a sparse set of motion vectors (for the current segment S with index s). In each iteration of the loop, in step 620, j-th motion vector is obtained, specified by its starting position ($Px_{s,i}$, $Py_{s,i}$) and the motion vector ($Vx_{s,i}$, $Vy_{s,i}$) associated with this position. Moreover, the weighting parameters are obtained, which specify the weighting function for the current segment S with index s. In particular, parameters $a_{s,j}$, $\sigma_{s,j}$, $c_{s,j}$ are obtained. It is noted that the weighting parameters may be specified for the current segment S and for the current motion vector j. In step 630 it is checked, whether the method already iterated over all N (in general $N_S$) motion vectors. If not ("Yes" in step 630), the method proceed to step 640. In step 640, affine parameters of affX$_{s,j}$ and affY$_{s,j}$ are derived for the j-th motion vector of the current segment. Step 640 will now be explain in detail.

Figure 7:
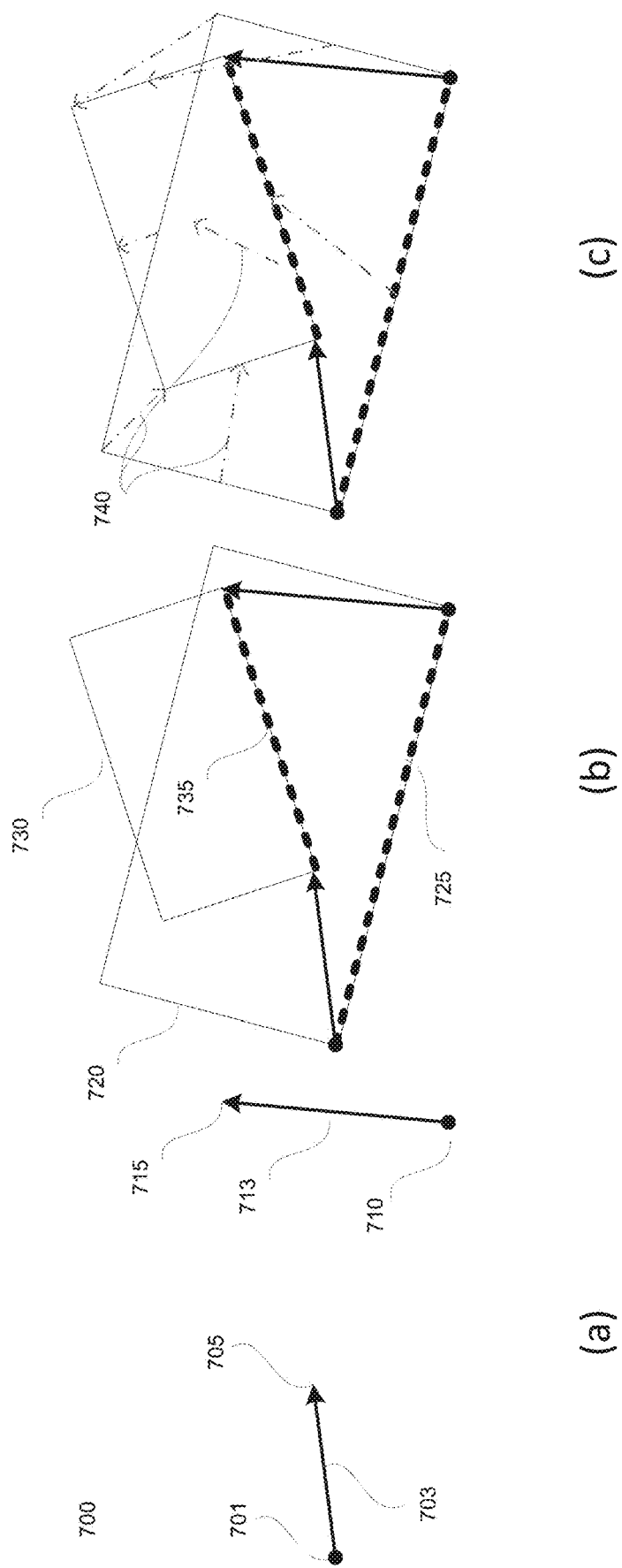
FIG. 7 is a schematic drawing illustrating two transformations of motion vectors.

In FIG. 7, an example of a restricted affine transform 700 representing a combination of a zoom, a rotation and some translational movement is shown. The term "restricted" here refers to the fact that this transformation can only represent the above-mentioned three kinds of motion (zoom, rotation, translation). However, the present disclosure is not limited thereto and, in general, transformations supporting a different number and kinds of transformations may be applied.

In sub-image (a), a first motion vector MV$_{s,0}$ (703) with starting position P$_{s,0}$ (701) and motion replacement to position 705 is shown, and represents the origin of the transformation (i.e. motion vector to be transformed). A second motion vector MV$_{s,1}$ (713) has a starting position P$_{s,1}$ (710) and motion replacement to position 715.

These two motion vectors can fully define an affine transformation of space with keeping the shape of an object transformed by such transformation 700. In this example, as can be seen in sub-image (b) of FIG. 7, a rectangle 720 is transformed to a rectangle 730, while maintaining the same aspect ratio of the rectangle sides. In other words, the aspect ratio of the rectangle sides is the same for the original triangle 720 and the transformed triangle 730. As can be seen in sub-image (b), the connection line 725 of the two starting position P$_{s,0}$ and P$_{s,1}$ (701 and 710) is linearly transformed to a connection line 735, which connects the target positions 705 and 715 after the transformation. In this specific case, motion vector 703 is the j-th motion vector and motion vector 713 is the (j+1)-the motion vector of an s-th segment, which together form a j-th pair of motion vectors. The distance between the position 701 of motion vector 703 and the position 710 of the motion vector 713 is given by its x and y components px$_{s,j}$ (x) and py$_{s,j}$ (y) as shown in the following expressions:

$$px_{s,j}=Px_{s,j+1}-Px_{s,j} \qquad [\text{Expr. 1}]$$

$$py_{s,j}=Py_{s,j+1}-Py_{s,j} \qquad [\text{Expr. 2}]$$

The parameters affX$_{s,j}$ and affY$_{s,j}$ of the affine transformation for the j-th pair of the motion vectors MV$_{s,j}$ and MV$_{s,j+1}$ can then be written as follows:

$$affX_{s,j}=((Vx_{s,j+1} \cdot px_{s,j}+Vy_{s,j+1} \cdot py_{s,j})-(Vx_{s,j} \cdot px_{s,j}+Vy_{s,j} \cdot py_{s,j}))/(px_{s,j}^2+py_{s,j}^2) \qquad [\text{Expr. 3}]$$

$$affY_{s,j}=((Vx_{s,j+1} \cdot py_{s,j}-Vy_{s,j+1} \cdot px_{s,j})-(Vx_{s,j} \cdot py_{s,j}-Vy_{s,j} \cdot px_{s,j}))/(px_{s,j}^2+py_{s,j}^2) \qquad [\text{Expr. 4}]$$

The affine transformation is illustrated in sub-image (c) of FIG. 7. In particular, dash-dotted lines 740 illustrate, how certain points of the rectangle 720 are transformed to the corresponding points of rectangle 730 and thus the lines 740 corresponds to motion vectors which may be now derived with the affine transformation in any point. Herein the motion vector pair is the pair of the j-th and (j+1)-th motion vectors, assuming some predefined ordering. However, in general, j may be replaced with i and j+1 may be replaced with j, denoting motion vector pair of i-th and j-the motion vectors. The transformation of the space is then fully determined (inside and outside of the rectangles) by the affine transformation (affX$_{s,0}$, affY$_{s,0}$) calculated for the first motion vector pair (j=0). In other words, interpolated motion vectors (mvx$_{s,0}$(x, y), mvy$_{s,0}$(x, y)) 740 can be derived at any position in 2D space.

In general, (mvx$_{s,j}$(x, y), mvy$_{s,j}$(x, y)) are components of a 2D motion vector which is obtained by the affine transformation of a point at a position (x, y) represented by the j$^{th}$ pair of motion vectors of segment S$_s$ as follows:

$$mvx_{s,j}(x,y)=Vx_{s,j}+dx_{s,j}(x,y) \cdot affX_{s,j}+dy_{s,j}(x,y) \cdot affY_{s,j} \qquad [\text{Expr. 5}]$$

$$mvy_{s,j}(x,y)=Vy_{s,j}+dx_{s,j}(x,y) \cdot (-affY_{s,j})+dy_{s,j}(x,y) \cdot affX_{s,j} \qquad [\text{Expr. 6}]$$

Moreover, dx$_{s,j}$(x, y) and dy$_{s,j}$(x, y) are components of a distance between the point (x, y) and the position P$_{s,j}$ of the first motion vector in the j-th pair of motion vector:

$$dx_{s,j}(x,y)=x-Px_{s,j} \qquad [\text{Expr. 7}]$$

$$dy_{s,j}(x,y)=y-Py_{s,j} \qquad [\text{Expr. 8}]$$

In this example, the restricted affine transformation supports a combination of zoom, rotation and translational movement and is represented by equations of expressions 5 and 6. It is noted that in general, the present disclosure is not limited to any particular transformation. The restricted affine transformation described herein is only an example. In general, more simple or more complicated transformations may be applied, e.g. transformations supporting some non-linear movement, or the like.

Figure 8:
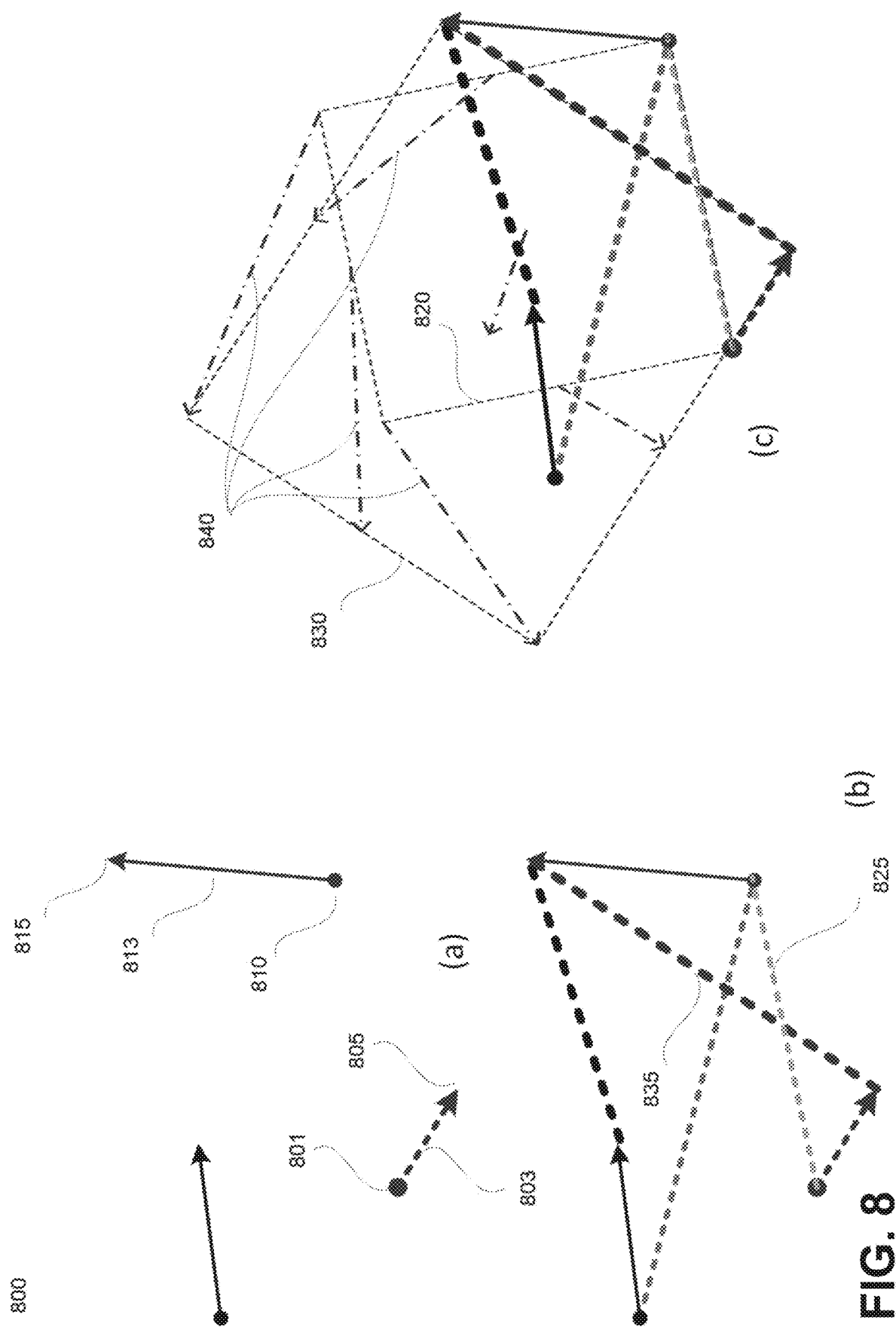
FIG. 8 is a schematic drawing illustrating two transformations of motion vectors.

It is noted that FIG. 7 shows a special case for j=0. FIG. 8 shows another example for j=1 (second iteration). In particular, FIG. 8 shows a combination of two restricted affine transformations defined by three motion vectors, namely the first transformation (affX$_{s,j}$, affY$_{s,j}$) determined for j=0 and a second transformation determined for j=1.

In FIG. 8, an additional motion vector MV$_{s,2}$ (803) forms the second motion vector pair (MV$_{s,1}$, MV$_{s,2}$) together with the motion vector MV$_{s,1}$. Motion vector MV$_{s,2}$ (803) has a starting point P$_{s,2}$ (801) and defines motion replacement to position 805. Motion vector MV$_{s,1}$ (813), corresponding to motion vector 713 of FIG. 7, starts at position 810 and defines motion replacement to position 815. These two motion vectors (the second motion vector pair) can fully define another (second) restricted affine transformation of the space. Another rectangle 820 is transformed to a rectangle 830 with the same aspect ratio of their sides.

In this specific case, the target rectangle 730 (in FIG. 8 denoted as 820) of the first affine transformation (affX$_{s,0}$, affY$_{s,0}$) is the origin rectangle 820 of the second affine transformation (affX$_{s,1}$, affY$_{s,1}$) 840. The target rectangle 830 of the second transformation is obtained as shown in FIG. 8. The connection line 825 of two starting position P$_{s,1}$ (810) and P$_{s,2}$ (801) is linearly transformed to line 835 which connects new positions 815 and 805 after the second affine transformation 840. Interpolated motion vectors (mvx$_{s,1}$(x, y), mvy$_{s,1}$(x, y)) (840) could be derived at any position in the 2D space.

The affine transformation parameters (affX$_{s,j}$, affY$_{s,j}$) are determined for all motion vector pairs in the loop of steps 620-640. Then, if there are no more pairs in the segment ("No" in step 630), the method proceeds to step 650.

Figure 9:
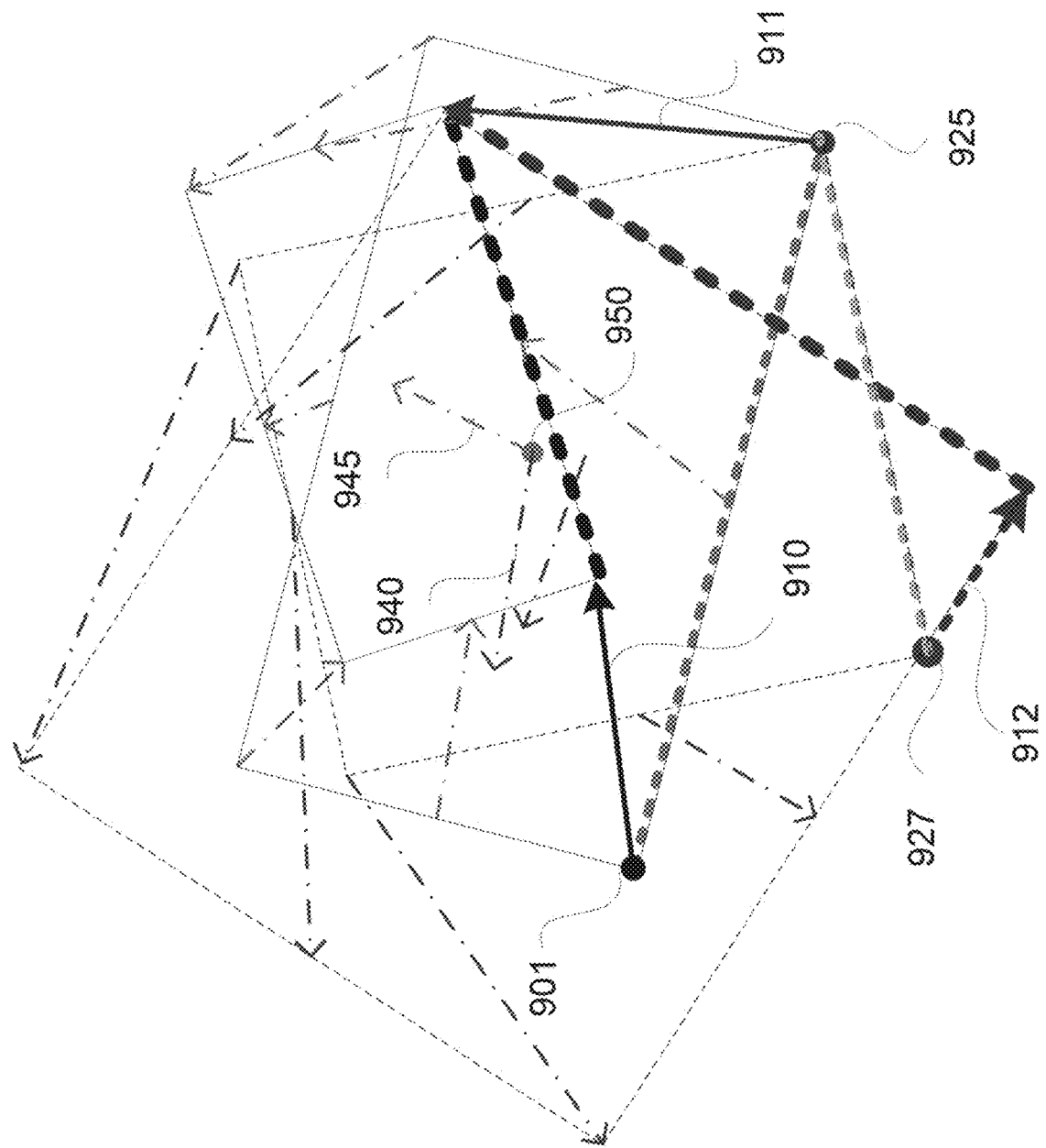
FIG. 9 is a schematic drawing illustrating two transformations of motion vectors and obtaining final motion vector.

FIG. 9 shows two collocated affine transformations in one 2D space. The three motion vectors 910, 911, 912 (corresponding to two motion vector pairs) specify two restricted affine transformations. Here, the term "collocated" refers to the fact that the transformations are defined for motion vectors of the same segment. Accordingly, a motion vector at each point of the segment may be obtained by any of the collocated transformations. The motion vectors in one point, obtained by different transformations, may differ. There are two motion vectors (940 and 945, as one of the examples) associated with each sample position (such as the position 950) in the 2D space as depicted in FIG. 9. A first motion vector 940 in point 950 is interpolated using the first affine transformation and a second motion vector 945 is interpolated using the second affine transformation. In order to obtain prediction for a sample on the position 950, one sample from the reference frame should be used, so that one motion vector should be provided to obtain the sample. In order to obtain a sole motion vector, while having two or more motion vectors, the normalised weighting sum is calculated for each interpolated MV position as depicted in FIG. 10.

Figure 10:
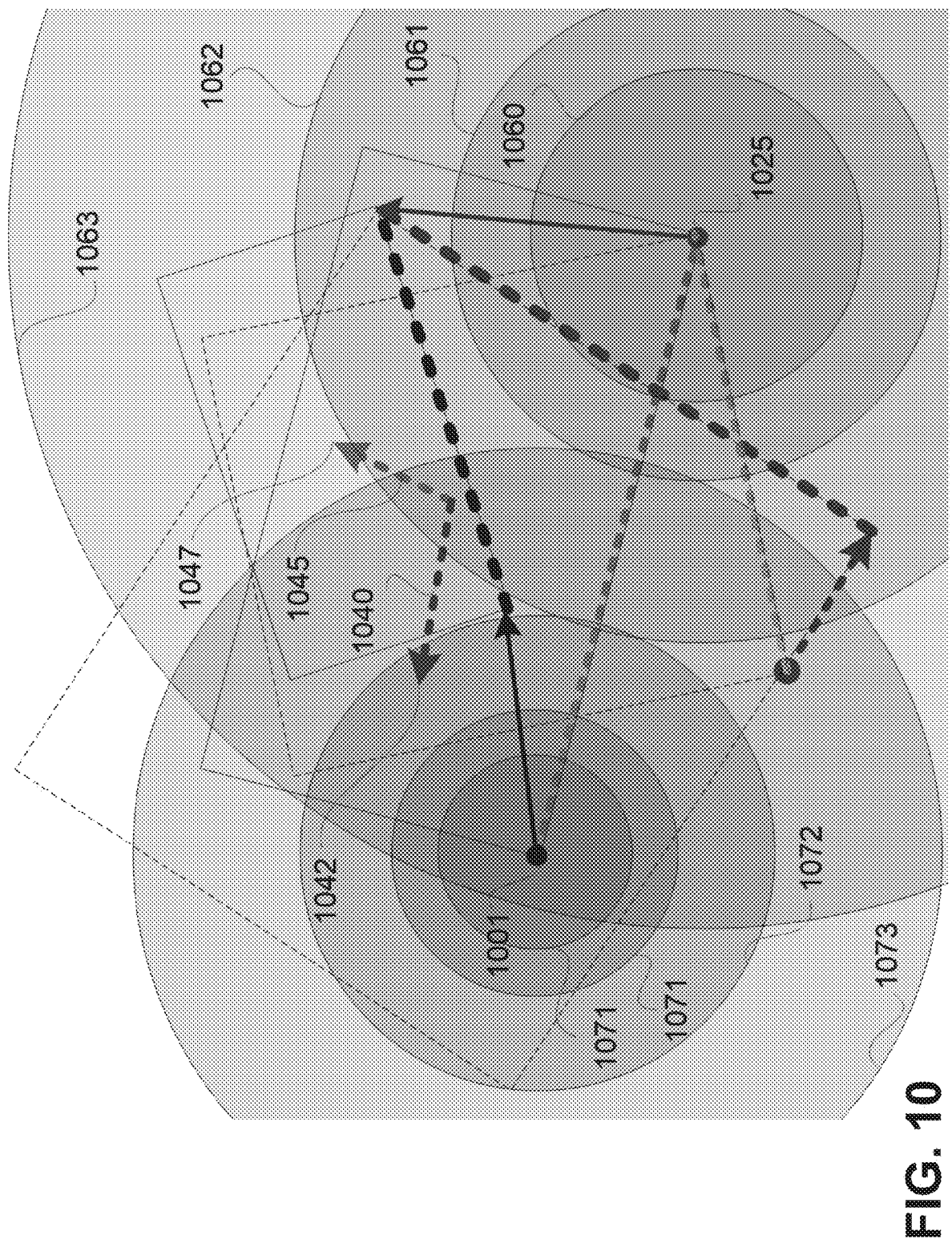
FIG. 10 is a schematic drawing illustrating distribution of weights.

FIG. 10 shows two collocated affine transformations. The values of weighting factors to weight two contributing motion vectors obtained by the respective two affine transformations are depicted using isolines. The term "isoline" refers to a line on which the weighting factor has the same value. The term "contributing" here refers to the contribution each of these motion vectors makes (weighted by the corresponding weight) to the final motion vector on the position 950. In particular, two attracting points $P_{s,0}$ (1001) and $P_{s,1}$ (1025) are located at starting point of first motion vector in each motion vector pair. The two attracting points 1001 and 1025 correspond to centres of respective 2D "bell"-shaped functions depicted by isolines. The isolines 1071, 1072, 1073 and 1074 correspond to the attracting point 1001 of the first motion vector pair and isolines 1061, 1062, 1063 and 1064 correspond to the attracting point 1025 of the second motion vector pair. It can be seen that weighting factor for weighting the motion vector 1045 is lower than weighting factor for the motion vector 1040, because the isoline 1072 of the corresponding weighting factor is further than for the other interpolated motion vector 1040, in terms of distance from the centres of the corresponding attracting positions (which may be also referred to as attraction positions). In other words, in this example, motion vector at a target point 950 is obtained as a weighted sum of contributing motion vectors. Contributing motion vector at the target point 950 is obtained by a predetermined transformation of a particular control motion vector. Different contributing motion vectors are obtained as (different) transformations of different respective control motion vectors. Here, the term different transformation refers to the same transformation rule having different parameters. However, the present disclosure is not limited thereto and different transformations with respective different transformation rules may be applied. The weighted function exemplified in some embodiments is non-linear. It awards a first contributing motion vector a larger weight than a second motion vector, if the first motion vector is obtained by transforming a third motion vector and the third motion vector is closer to the target position than a fourth motion vector of which a transformation resulted in the second motion vector. The non-linearity herein awards the first contributing motion vector the weight larger than a linear distribution of weights between the first and the second motion vector would do. One of the examples of such non-linear function is the Gaussian distribution function. However, other functions such as cosine, Laplace distribution, or the like may be used. The weights of all contributing motion vectors (in this example two, but in some embodiments more than two) sum up to 1 (as, e.g., the probability distribution functions do).

In the loop of steps 650 and 660 of FIG. 6, the dense motion field is interpolated for each point in the collocated 2D space. In particular, in step 650, it is checked whether the interpolation has been already done for each of the positions (x, y) in the current segment $S_S$. If not ("No" in step 650), the loop proceeds by interpolating 660 the current position (x, y). By performing the step 660 for all (x, y) positions of the current segment, the dense motion field is obtained.

The following expressions 9 and 10 show an example of deriving dense motion vector field (MVF) corresponding to step 660 performed for a position (x, y):

$$MVF_x(x,y) = \sum_{j=0}^{N-1} w_{s,j}(x,y) * mvx_{s,j}(x,y) \bigg/ \sum_{j=0}^{N-1} w_{s,j}(x,y) \quad \text{[Expr. 9]}$$

$$MVF_y(x,y) = \sum_{j=0}^{N-1} w_{s,j}(x,y) * mvy_{s,j}(x,y) \bigg/ \sum_{j=0}^{N-1} w_{s,j}(x,y) \quad \text{[Expr. 10]}$$

In this particular example, the weights $w_{s,j}(x, y)$ are determined by a function with a bell shape, such as the Gaussian distribution function shown in expression 11:

$$w_{s,j}(x,y) = a_{s,j} \cdot e^{-d_{s,j}(x,y)^2 / 2\sigma_{s,j}^2} + c_{s,j} \quad \text{[Expr. 11]}$$

wherein $d_{s,j}(x, y)$ represents the distance between point (x, y) and the position $P_{s,j}$ of the first (origin) motion vector in a j-th pair of motion vectors:

$$d_{s,j}(x,y) = \sqrt[k]{dx_{s,j}(x,y)^2 + dy_{s,j}(x,y)^2} \quad \text{[Expr. 11]}$$

Here, for the sake of example, k=2. However, the present disclosure is not limited to the Euclidean distance (applying squared norm). Rather, k may be 1 or 3, or any other metric. It is further noted that the bell-shaped curve does not have to from isolines, which are circles; they may form ellipse. Furthermore, the present disclosure is not limited to application of the bell-shaped curves and may apply other functions to determined distribution of weights in the space of the segment. The other functions may be non-linear, in order to accentuate more the closer surrounding or the starting point of the first motion vector surroundings. However, the present disclosure may employ other functions.

After performing the loop over step 660 for all positions (x, y), in step 670, the dense motion vector is obtained. It is noted that step 670 in FIG. 6 is to illustrate the result of the loop, and may include storing the dense motion field in a storage such as memory. However, step 670 does not need to be explicitly present in the method, as steps 660 of the loop already result in provision of the dense motion field. In step 680, it is tested, whether all segments have already been processed. If there are still some segments to be processed ("Yes" in step 680, meaning that not all segments out of the M segments have been processed), then the loop over segments continues with invoking 615 and the following steps again, as described above. If all segments of a picture have been processed, then the method ends. It is noted that in principle, when processing the segments of a picture (image, frame), not all segments must be processed. For example, in some approaches and applications, it may be desirable, to only provide dense motion vector representation for parts of the picture. For example, the encoder, as shown in FIG. 5 and described with reference thereto above, may select that the dense motion field representation/reconstruction is only employed for some parts of the picture (e.g. as a prediction mode). Other parts of the picture may be processed (encoded) using different prediction modes, or not predicted at all.

One examples for parts of the picture is multi-reference inter prediction. Accordingly, some portion(s) of the picture are predicted from one reference picture, while (an)other portion(s) of the picture are predicted from another reference picture. A special case of the multi-reference prediction is bi-directional picture prediction. For example, the same picture portion can be predicted as a weighted sum (in sample value domain) of a predicted samples after applying different transformations based on different reference frames. In other words, the present disclosure is also applicable for multi-reference prediction case.

Figure 11:
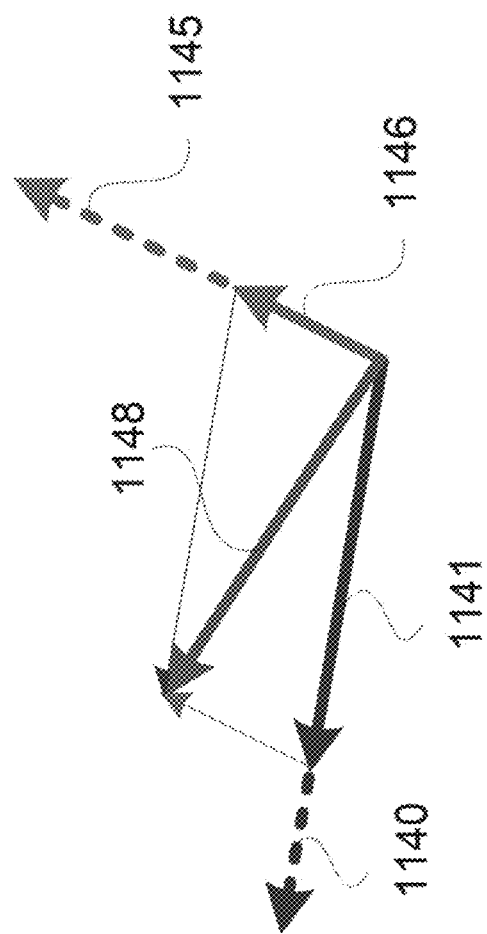
FIG. 11 is a schematic drawing illustrating obtaining of the estimated motion vector using weighting.

FIG. 11 illustrates an example of the weighting of two motion vectors 1140, 1145. Motion vector 1140 is adjusted by weighting to motion vector 1141 and has a higher weight than the motion vector 1145. Motion vector 1145 is adjusted to motion vector 1146. Finally, the sum of the two weighted MVs 1141 and 1146 is represented by the resulting motion vector 1148.

In other words, in some embodiments of the present disclosure, interpolation of motion vectors is provided, between available control points with control motion vectors. Here, the terms "control" points and "control" motion vectors refer to the positions and motion vectors starting at those positions, which are given as an input to the above-mentioned dense motion field reconstruction. For example, the control positions and the control motion vectors may be identified at the encoder and embedded into a bitstream which is provided to the decoder to reconstruct the motion field. In other words, the control positions and control motion vectors control the (re)construction of the dense motion field, i.e. the (re)construction of any other motion vectors of the segment (motion vectors on any other position within the segment).

The embodiments of the present disclosure as described above show construction of a motion field (approximating optical flow) based on the control positions and control motion vectors. Such construction may be readily used in an encoder as show in FIG. 1 or FIG. 5 or in a decoder as shown in FIG. 2. However, the applications of the present disclosure are not limited to video encoding and decoding. Any applications, which may make use of an efficient storing or transmitting of an optical flow (motion field) may employ embodiments of the present disclosure.

The following processing components of motion vector derivation may be employed:
Motion model is based on an optical flow of a segment (may be referred to as a prediction unit when employed in video coding/decoding as a prediction mode). This is achieved by deriving the transformation (in the preceding example the affine transformation) from the control positions and the control motion vectors having the control positions as starting positions.

Few control points are assigned for each segment. This can be seen as subsampling of the optical flow. For the purpose of the present disclosure, it is immaterial, how the subsampling is performed. One of the advantages of the embodiment and examples of the present disclosure is that any regular or irregular subsampling may be used. In particular, the subsampling does not have to follow any regular pattern and in each segment, a different number and/or location of control positions may be provided. This enables adapting the subsampling to the content and thereby further increase the efficiency of the compression by means of reconstruction quality provided for certain bitstream size (rate-distortion relation).

Non-linear motion vectors (i.e. motion vectors for non-linear movement) may be derived from the optical flow and associated with each point (sample position).

In some embodiments, each consecutive pair of motion vectors ($MV_0$, $MV_1$), ($MV_1$, $MV_2$) . . . can determine the affine optical flow. Here, $MV_i$ is a motion vector with starting position $P_{s,i}$ and their MV delta $MV_{s,i}$, with i=0 . . . $N_s$ (N may depend on the size of the segment). This is a specific example, in which the motion vectors are ordered and the target motion vector of one transformation is an origin motion vector of another transformation. However, the present disclosure is not limited thereby and the affine transformations may be derived using any (also unrelated) pairs of motion vectors. Still further, the transformation does not necessarily need to be determined from a pair of motion vectors. Rather, it may be given in another way and/or associated with only a single motion vector. This may be advantageous for simple kinds of motion such as translation motion, or the like.

The weighted sum of several affine motion fields provides the final representation of the dense motion vector field. In other words, each affine transformation specifies motion vector at any position within the segment. With several affine transformations, there are several respective motion fields. In order to obtain one resulting motion field, these several motion fields are weighted. There may be two or more such fields corresponding to the respective affine transformations.

The "bell"-shaped (Gaussian) distribution may be used for determining the weights for the respective motion fields. The parameters of the Gaussian distribution function can be signalled or can be determined by encoder and decoder following the same rules (such as unsupervised learning, for instance, Gaussian Mixture Model (GMM)).

One of the embodiments takes a weighted sum of two or more motion vectors at each sample position. The parameters could be adjusted according to the content of the image. The strength of "bell"-shaped function $a_{s,j}$ allows to increase non-linear influence for a particular pair of motion vectors. Parameters $\sigma_{s,j}$ have influence on spread of the distribution and $c_{s,j}$ is linear parameter, which allows to control spread as well, but linearly.

When storing or signalling the parameters from which the motion field is (re)constructed, it is advantageous to ensure that the encoder and the decoder will parse (syntax) and interpret (semantic) the parameters in the same way. This may be achieved by some advantageous syntax and/or semantic rules. For example, depending on a predetermined rule of interpretation a list of motion vectors may be provided, and then the reconstruction method may work as follows.

Consecutively use pairs of motion vectors like ($MV_0$, $MV_1$) then ($MV_1$,$MV_2$) . . . . This has been already exemplified above, where a target MV of a first transformation is an origin MV of a second transformation.

To use the pairs of motion vectors independently ($MV_0$, $MV_1$) then ($MV_2$,$MV_3$) . . . (this is equivalent to setting each second weight to zero in the preceding option), where $MV_i$ is ($P_{s,i}$, $MV_{s,i}$).

It is noted that in some implementations it is possible to have one (or more) motion pair, which has one motion vector in a first segment and another motion vector in a second segment, wherein the first segment and the second segment are different. Such approach creates dependencies between segments. In other implementations, such dependencies are avoided.

To support translational motion model by using only one motion vector within particular segments/units the $N_s$ could be equal to 1. In this case the only one pair of MVs could be generated by duplicating of first MV with a small shift of their position $(1,0)+P_{s,i}$. Then the first of the above-mentioned approaches may be used. In general, one position and motion vector is signaled. A second one position is derived implicitly by adding a small offset vector mvOff (here exemplified as horizontal shift by 1 sample (1,0), but in general any horizontal and/or vertical shift). The motion vector direction/size may remain the same.

The order in the list of motion vectors is important for the interpretation in the same way by the encoder and the decoder. The following orderings may be applied.

The first items in the list could have higher weights than the later items in the list. In other words, index j within the list of motion vectors (or motion vector pairs) may be used to derive the weights of the motion vectors.

Weights could depend on the distance from previous items in the list (the higher the distance, the larger the weight, or wise-versa).

Weights could depend on control points distribution and could be trainable with using of an artificial intelligence such as a neural network.

The distance in expression 11 can be estimated relative to the position of the second motion vector in the motion vector pair or as minimum distance to the line-segment connecting positions of the first and the second motion vector in the motion vector pair. The above example with expression 11 estimates the distance relative to the positon of the first motion vector.

Some of the advantages of the present disclosure are provided in the following:

Provision of an ability to support higher order of motion models for video compression, while keeping the signaling overhead as small as possible.

Possibility to avoid overlaps and discontinuities of the segments with backward motion prediction, e.g. on the basis of the optical flow.

Possibility to combine some connected segments which may have mutually different motion (like body and hands).

Applicability for any dimensions 2D (two MVs), 3D (two MVs+rotation angle) or higher.

Figures 12, 13:
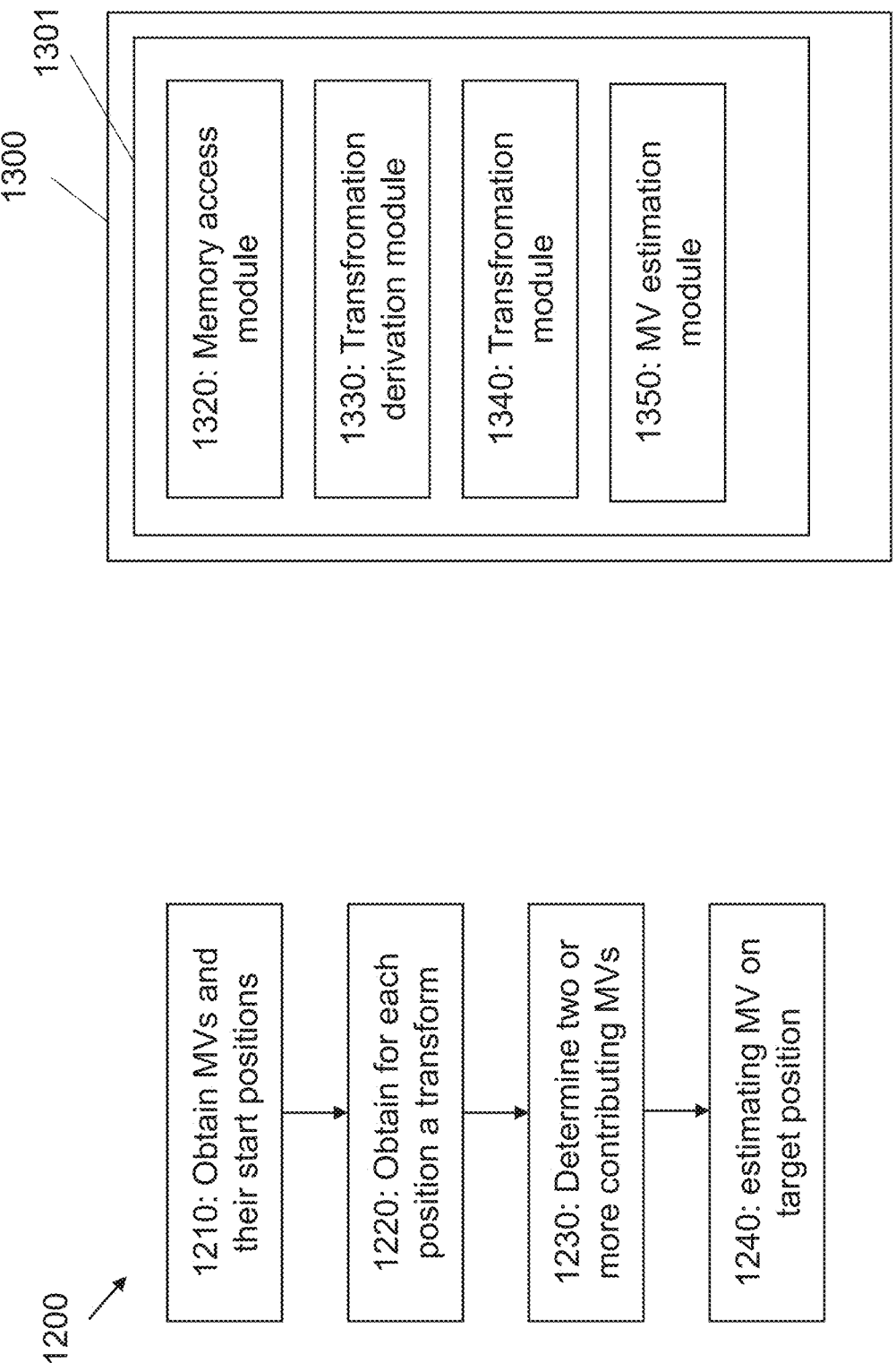
FIG. 12 is a flow diagram illustrating a method for estimation of a motion vector at a given target position.
FIG. 13 is a block diagram illustrating an apparatus for estimation of a motion vector at a given target position.

The method described with reference to FIG. 6 included details, which may be omitted or replaced by alternatives. FIG. 12 shows a flow chart of another method according to an embodiment.

According to this embodiment, a method 1200 is provided for estimating a motion vector at a target position (such as 950). It is advantageous that the method is provided to estimate the motion vector at each target position among all positions of a picture. Such positions may be some or all integer samples (pixels) of an image. However, it is noted that with the above-described motion field derivation, motion vectors on non-integer positions may be derived in the same way. It is noted that the term dense motion field refers to all samples in a desired grid of samples (desired resolution).

The method comprises a step 1210 of obtaining two or more start positions (such as 901, 925) and two or more motion vectors (such as 910, 911) starting respectively at the two or more start positions (such as 901, 925). The obtaining 1210 may be accomplished by reading the positions and the corresponding motion vectors from a memory, receiving them from an application or as a result of some preceding determination (such as subsampling of a dense motion field), or by parsing them from a bitstream received from memory or over a channel, or the like. Similarly, step 1220 includes obtaining, for each start position (such as 901, 925) of the two or more start positions, a corresponding transformation (such as 740, 840) for transforming the motion vector (such as 910, 911) starting at said start position (such as 901, 925) to another position (such as 925, 927).The obtaining 1220 of the transformation may be performed in any manner. For example, it may be calculated using the positions and the motion vectors obtained in step 1210. However, the present disclosure is not limited by this example and the transformation may be defined (obtained) in another way. The transformation here may mean parameters of the transformation. For example, as shown above the transformation may be an affine transformation in which zoom, rotation and translation may be modelled. Then, the parameters of such transformation are determined. Alternatively, or in addition, the type of transformation may also be obtained.

The method 1200 further comprises determining 1230 two or more contributing motion vectors (such as 1140, 1145) by transforming each of said two or more motion vectors (such as 910, 911) with the corresponding transformation (such as 740, 840) from said start position (such as 901, 925) to the target position 950 of the corresponding transformation (such as 740, 840). Moreover, after determining the contributing motion vectors, the method further includes the step of estimating 1240 the motion vector (such as 1148) at the target position 950 including weighted average of the two or more contributing motion vectors (such as 1140, 1145).

In the method 1200, the weighted average may be calculated by weighting each of the two or more contributing motion vectors by weights which are non-linear functions of a distance between the start positions (of the motion vectors from which the contributing vectors are obtained by transformation) and the target position 950. As mentioned above, in order to maintain the proper dimensions, it may be advantageous when the sum of all weights is equal to one. The non-linear function in some embodiments is a function that has its maximum in zero (corresponding to distance zero from the starting position of the MV, which is transformed to form a contributing MV). For example, the non-linear function is a Gaussian distribution function.

In some embodiments, the distance corresponds to the square norm, i.e. to the Euclidean distance in the space given by the one (current) segment or more segments. However, this is not to limit the present disclosure. The distance may be define by other norm such absolute difference or a higher norm or some other distance measures.

The obtaining 1220 of the corresponding transformation may comprise obtaining motion vector (such as 911, 912) starting at the other position (such as 925, 927) and estimating parameters of an affine transformation based on affine transforming of the motion vector (such as 901, 911) starting at said start position (such as 901, 925) to the motion vector (such as 911, 912) starting at the other position (such as 925, 927). As mentioned above, affine transformation is only one specific example. The present disclosure is not limited thereto and, in general, any one or more transformations may be applied. The transformation may model, for instance non-linear motion or the like. For example, the two or more start positions belong to a set of $N_S$ start positions with $N_S>2$, ordered in a predefined order, and for a start position j, $0 \leq j \leq N_S$, the other position is a position j+1 in the predefined order. In particular, the weight of a contributing vector may depend on the position, within the predefined order, of the starting position of the respective transformed motion vector.

In some embodiments, the two or more start positions are sample positions in a segment of an image, wherein the image includes a plurality of segments, wherein the segment is a set of image samples smaller than the image. For example, the samples may be the pixels (for example integer pixels or, in general, pixels in the desired grid of pixels) of the image. However, it is noted that the disclosure is not limited to such examples. One of the advantages of these embodiments is that the motion vectors can be predicted at any positions, including sub-sample positions. In fact, using sub-sample (sub-pel) precision may be beneficial for some applications such as video encoding and decoding. The segments may be predefined segments such as unites (blocks) of certain predetermined size known to an encoder and a decoder. The segments do not need to be rectangular or quadratic. They may correspond to some other meaningful image areas already supported by a codec, it the present disclosure is used in a codec. For example, the segments may correspond to CTUs, slices or tiles as mentioned above with reference to FIGS. 1 and 2. However, the present disclosure may also employ segments of a different kinds such as segments corresponding to objects. In such case, the image may be segmented into objects, and one of the objects may also correspond to the background. Moreover, it is noted that segments do not have to be continuous and may also be distributed. In other words, parts of the same segment do not have to have a boundary to any other parts of the same segment. In particular, in some embodiments, it may be advantageous, if the segments are obtained based on the motion characteristics, so that the portions of image with similar motion characteristics are organized into common segment.

The method may further comprise a step of reconstructing a motion vector field of said segment of image, including estimating a motion vector starting at each sample target position P(x,y) of the segment, which do not belong to the two or more start positions for which respective motion vectors are available. In other words, as already shown in some embodiments and examples above, motion vectors may be derived to obtain a dense motion field, which approximates optical flow in the image.

In particular, the two or more start positions and the two or more motion vectors starting respectively at the two or more start positions are obtained by parsing from a bitstream related to said segment of the image. The weights applied in the weighted average are determined based on one or more parameters parsed from the bitstream. This approach is particularly suitable for deployment of the present disclosure as a part of an encoder or an encoding method.

Alternatively, or in addition, the two or more start positions within the segment of the image are determined based on a feature of the segment decoded from a bitstream. The two or more motion vectors starting respectively at the two or more start positions are obtained by parsing from the bitstream related to said segment. The weights applied in the weighted average are determined based on one or more parameters parsed from the bitstream. This approach is particularly suitable for deployment of the present disclosure as a part of a decoder or a decoding method.

In an embodiments, the two or more start positions and the two or more motion vectors starting respectively at the two or more start positions are obtained by determining a motion vector field including a motion vector for each sample position (as target position) of said segment of the image and by subsampling the obtained motion vector field. Alternatively or in addition, the weights of the respective contributing motion vectors are determining by rate-distortion optimization or by machine learning.

As mentioned above, the motion vector estimation (derivation) of the present disclosure may be employed within an encoding and a decoding method. Accordingly, such method for decoding may be provided for decoding of an image. The method may comprise estimating a motion vector at a sample target position according to any of the above mentioned embodiments or examples. Moreover, the decoding method may further comprise a step of predicting a sample at the target position in the image according to the estimated motion vector and a corresponding reference picture. Furthermore, the decoding method may comprise reconstructing the sample at the target position based on the prediction.

Correspondingly, a method for encoding of an image is provided. The method may comprise the step of estimating a motion vector at a target position according to any of the above mentioned embodiments or examples. The encoding method comprises predicting a sample at the target position in the image according to the estimated motion vector and a corresponding reference picture. The method further comprises encoding the sample at the target based on the prediction.

The encoding method may include further steps, such as, prior to the estimation, determining a dense motion field, subsampling the determined motion field, so as to obtain the at least two positions and the corresponding motion vectors, i.e. motion vectors starting at the positions which result from the subsampling.

The present disclosure also provides apparatuses corresponding to the above mentioned methods. Namely, the apparatuses may be capable of and configured to perform the steps of the above mentioned methods.

FIG. 13 shows an apparatus 1300 for estimating a motion vector at a target position. The apparatus comprises processing circuitry 1301. The processing circuitry may be implemented by one or more processors. As explained above, these processor(s) may be general-purpose processors or special processors such as digital signal processors, programmable hardware and/or specialized circuitry such as ASIC. It is noted that the processing circuitry 1301 may also implement (embody) further functions, different from the functions relates to the motion vector estimation. For example, the processing circuitry may also implement an encoder and/or a decoder for encoding/decoding of images (video frames) using the motion estimation.

The processing circuitry 1301 may further comprise circuitry 1320 configured for obtaining two or more start positions and two or more motion vectors starting respectively at the two or more start positions. The circuitry 1320 may be seen as a functional module or unit configured to obtain the two or more start positions and two or more motion vectors. Such module/unit/circuitry 1320 may be a spatially separate part of the processing circuitry 1301, or may share processing circuitry spatially with further functional modules/units. The module 1320 may be a memory/storage reading module. The storage may be part of the apparatus 1300, but does not have to be. It may be a part of the processing circuitry 1301, but does not have to be. It is noted that the processing circuitry 1301 may be an integrated circuit on a single chip. However, further configurations are possible. For example, the entire apparatus 1300 may be integrated on a chip.

Moreover, the processing unit may include circuitry 1330 configured for obtaining, for each start position of the two or more start positions, a corresponding transformation for transforming the motion vector starting at said start position to another position. Similarly to the module 1320, the circuitry 1330 may correspond to a functional module/unit such as transformation determination unit. The transformation determination unit/module 1330 may obtain the transformation by computing it from the positions and motion vectors obtained by module 1320 and based on the type of transformation (such as an affine transformation) to be determined. The determination may include determination of the parameters of such transformation.

The processing circuitry 1301 may further comprise circuitry 1340 configured to determine two or more contributing motion vectors by transforming each of said two or more motion vectors with the corresponding transformation from said start position to the target position of the corresponding transformation. This circuitry corresponds to a functional unit, such as a transformation module 1340. This module may be controlled by the transformation determination module 1330, which determines the transformation and provides it to the transformation module 1340 that applies the transformation.

The processing circuitry 1301 may further comprise circuitry 1350 configured for estimating the motion vector at the target position including weighted average of the two or more contributing motion vectors. This circuitry may correspond to a functional unit such as a motion vector estimation module 1350. The module is configured to estimate the motion vector on the target positions based on the contributing motion vectors obtained from the transformation module 1340. Moreover, the memory reading circuitry 1320 may also obtain the weighting function and/or weights for the respective contributing motion vectors and provide them to the MV estimation module 1350.

As mentioned above, an encoding device (apparatus) 20 is also provided. The encoding device may be an encoder (or a combined encoder and decoder) for encoding of an image among a plurality of images of a video sequence. The encoder 20 may include the apparatus 1300 for estimating a motion vector at a target position. The encoder 20 may further include a sample predictor 244 for predicting a sample at the target position in the image according to the estimated motion vector and a corresponding reference picture. The apparatus 1300 may be part of the predictor 244. The encoder 20 may further comprise a bitstream generator 270 for encoding the sample at the target position based on the prediction.

A decoding device 30 for decoding of an image may also be provided. Such decoder 30 may comprise the apparatus 1300 for estimating a motion vector at a target position, a sample predictor 344 for predicting a sample at the target position in the image according to the estimated motion vector and a corresponding reference picture; and a sample reconstructor 314 for reconstructing the sample at the target position based on the prediction.

Figure 14:
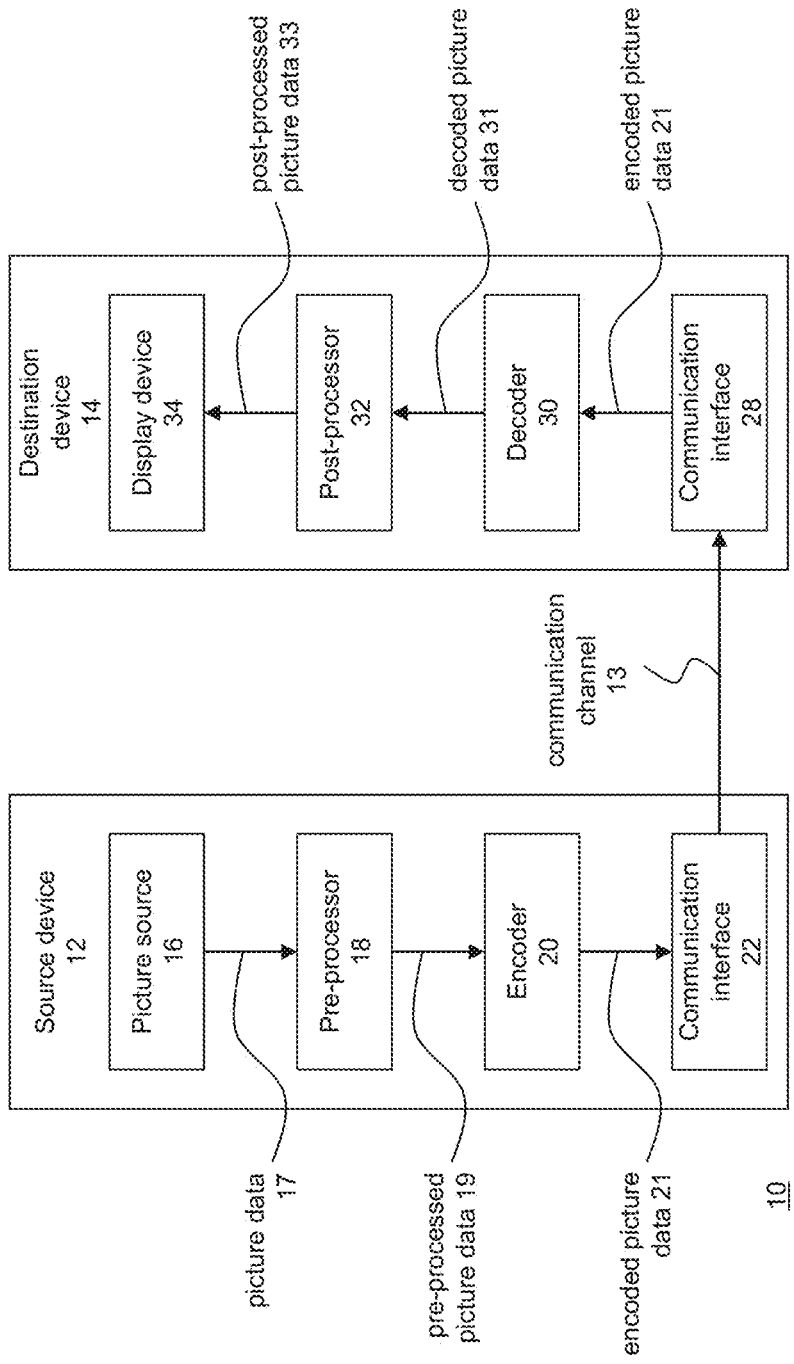
FIG. 14 is a block diagram showing an example of a video coding system configurable to implement some embodiments.

FIG. 14 is a schematic block diagram illustrating an example coding system 10, e.g. a video coding system 10 (or short coding system 10) that may utilize techniques of this present disclosure. Video encoder 20 (or short encoder 20) and video decoder 30 (or short decoder 30) of video coding system 10 represent examples of devices that may be configured to perform techniques in accordance with various examples described in the present application. In particular, the encoder 20 may correspond to the encoder shown in FIG. 1 or in FIG. 5. The decoder 30 may correspond to the decoder shown in FIG. 2, or the like.

As shown in FIG. 14, the coding system 10 comprises a source device 12 configured to provide encoded picture data 21 e.g. to a destination device 14 for decoding the encoded picture data 13. The source device 12 comprises an encoder 20, and may additionally, i.e. optionally, comprise a picture source 16, a pre-processor (or pre-processing unit) 18, e.g. a picture pre-processor 18, and a communication interface or communication unit 22. The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17. Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21. Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction. The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30. The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network. The communication interface 28, forming the counterpart of the communication interface 22, may be, e.g., configured to receive the transmitted data and process the transmission data using any kind of corresponding transmission decoding or processing and/or de-packaging to obtain the encoded picture data 21. Both, communication interface 22 and communication interface 28 may be configured as unidirectional communication interfaces as indicated by the arrow for the communication channel 13 in FIG. 14 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31. The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 14 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof. As will be apparent for the skilled person based on the description, the existence and (exact) split of functionalities of the different units or functionalities within the source device 12 and/or destination device 14 as shown in FIG. 14 may vary depending on the actual device and application.

Figure 15:
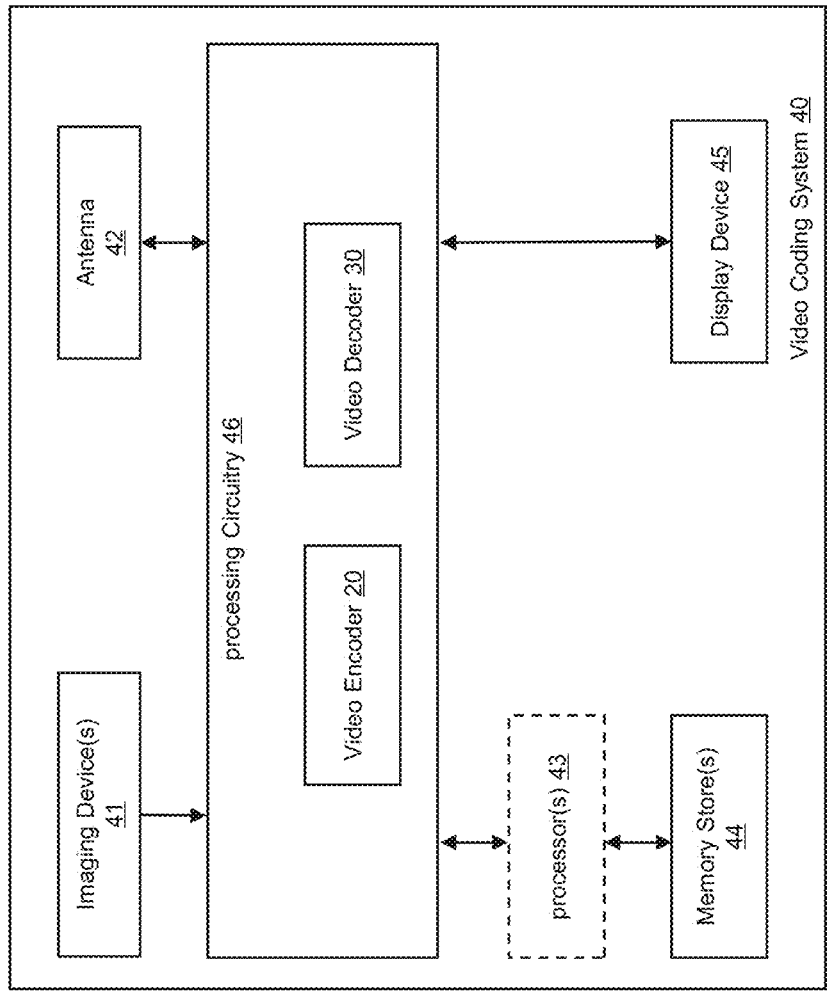
FIG. 15 is a block diagram showing another example of a video coding system configurable to implement some embodiments.
Figure 17:
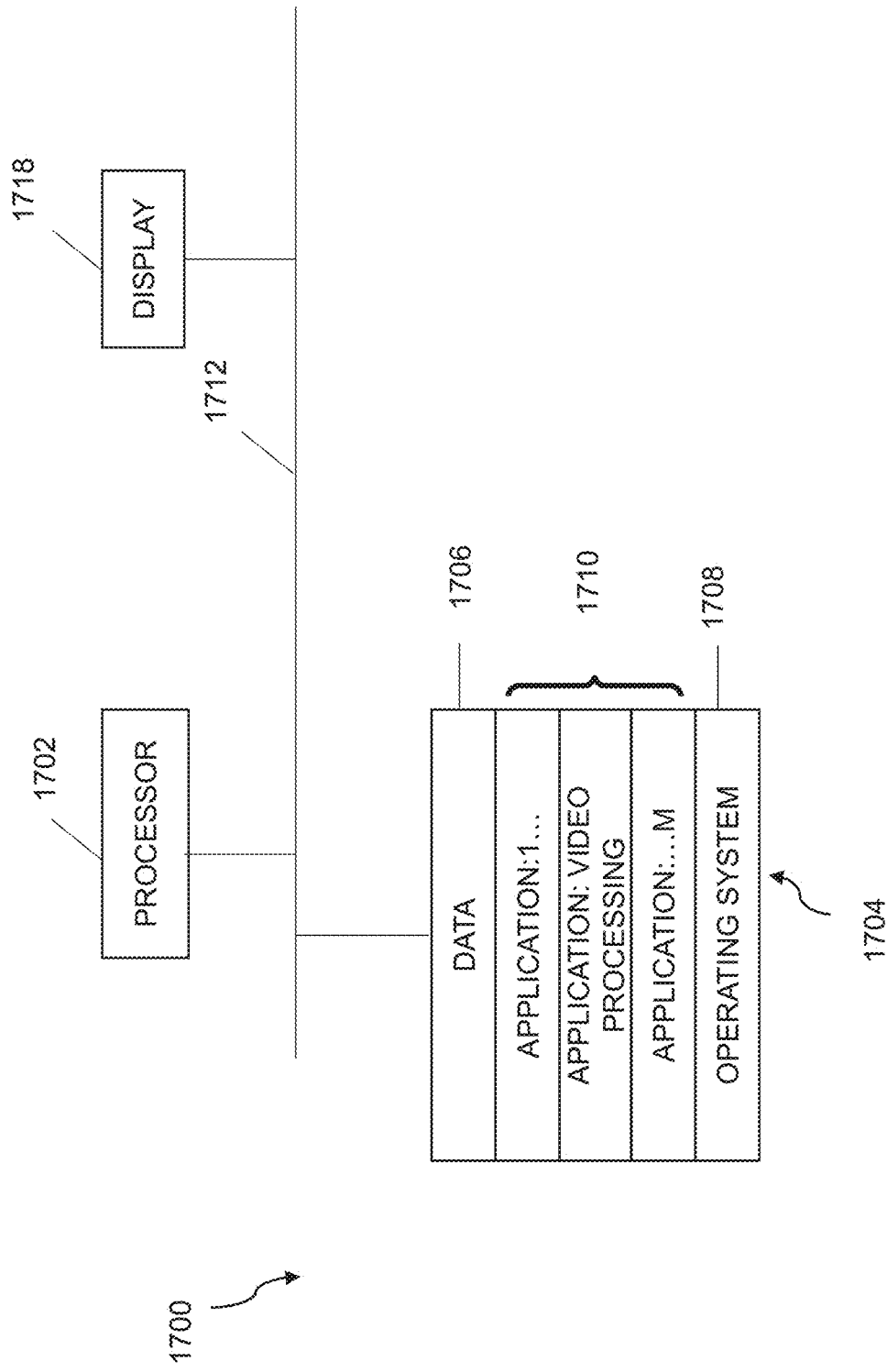
FIG. 17 is a block diagram illustrating another example of an encoding apparatus or a decoding apparatus.

The encoder 20 (e.g. a video encoder 20) or the decoder 30 (e.g. a video decoder 30) or both encoder 20 and decoder 30 may be implemented via processing circuitry as shown in FIG. 15, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 1 and/or any other encoder system or subsystem described herein. The decoder 30 may be implemented via processing circuitry 46 to embody the various modules as discussed with respect to decoder 30 of FIG. 2 and/or any other decoder system or subsystem described herein. The processing circuitry may be configured to perform the various operations as discussed later. As shown in FIG. 17, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 15.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 14 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory. For convenience of description, embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments are not limited to HEVC or VVC.

Figure 16:
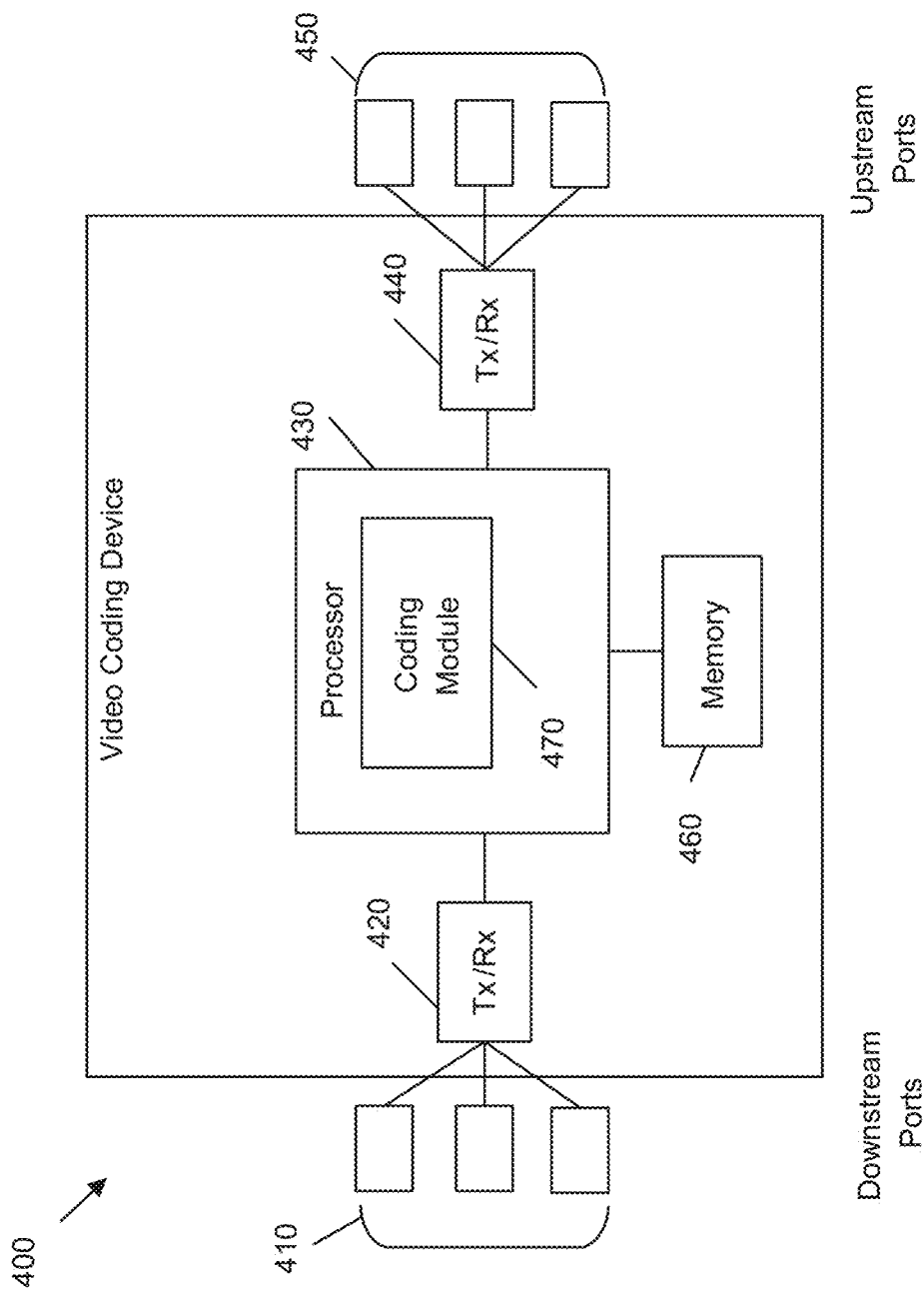
FIG. 16 is a block diagram illustrating an example of an encoding apparatus or a decoding apparatus.

FIG. 16 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 14 or an encoder such as video encoder 20 of FIG. 14. The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 17 is a simplified block diagram of an apparatus 1700 that may be used as either or both of the source device 12 and the destination device 14 from FIG. 14 according to an embodiment. A processor 1702 in the apparatus 1700 can be a central processing unit. Alternatively, the processor 1702 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 1704 in the apparatus 1700 can be a read only memory (ROM) device or a random access memory (RAM) device in an implementation. Any other suitable type of storage device can be used as the memory 1704. The memory 1704 can include code and data 1706 that is accessed by the processor 1702 using a bus 1712. The memory 1704 can further include an operating system 1708 and application programs 1710, the application programs 1710 including at least one program that permits the processor 1702 to perform the methods described here. For example, the application programs 1710 can include applications 1 through N, which further include a video coding application that performs the methods described here.

The apparatus 1700 can also include one or more output devices, such as a display 1718. The display 1718 may be, in one example, a touch sensitive display that combines a display with a touch sensitive element that is operable to sense touch inputs. The display 1718 can be coupled to the processor 1702 via the bus 1712. Although depicted here as a single bus, the bus 1712 of the apparatus 1700 can be composed of multiple buses. Further, the secondary storage 1714 can be directly coupled to the other components of the apparatus 1700 or can be accessed via a network and can comprise a single integrated unit such as a memory card or multiple units such as multiple memory cards. The apparatus 1700 can thus be implemented in a wide variety of configurations.

Summarizing, the disclosure provides methods and apparatuses for estimating motion vectors of a dense motion field based on subsampled sparse motion field. The sparse motion field includes two or more motion vectors with their respective start positions. For each of the motion vectors, a transformation is derived which transforms the motion vector from its start point into a target point. The transformed motion vectors then contribute to the estimated motion vector on the target position. The contribution of each motion vector is weighted. Such motion estimation may be readily used for video encoding and decoding.

What is claimed is:

1. A method for estimating a motion vector at a target position, the method comprising:
    obtaining two or more start positions and two or more motion vectors, each respective motion vector of the two or more motion vectors starting from a respective one of the two or more start positions,
    obtaining, for each respective start position of the two or more start positions, a respective transformation corresponding to the respective start position, the respective transformation being configured to transform the respective motion vector starting at the respective start position to another respective start position, wherein the obtaining a respective transformation corresponding to a respective start position comprises:
    obtaining a motion vector starting at the another respective start position, and
    estimating parameters of an affine transformation based on an affine transforming of the motion vector starting at the respective start position to the motion vector starting at the another respective start position;
    obtaining two or more contributing motion vectors by determining, for each respective motion vector of the two or more motion vectors, a respective contributing motion vector by transforming the respective motion vector, with the respective transformation corresponding to the respective start position of the respective motion vector, to a target position of the respective transformation; and
    estimating the motion vector at the target position to provide an estimated motion vector, wherein the estimating the motion vector includes determining a weighted average of the two or more contributing motion vectors,
    wherein the two or more start positions belong to a set of Ns start positions with Ns>2, ordered in a predefined order,
    wherein, for a respective start position j, 0≤j≤Ns, the another respective position is a position i+1 in the predefined order, and
    wherein a weight, in the weighted average, of a contributing vector depends on a position, within the predefined order, of a respective starting position of the respective transformed motion vector.

2. The method according to claim 1, wherein the weighted average is calculated by weighting each of the two or more contributing motion vectors by weights that are non-linear functions of a distance between the two or more start positions and the target position.

3. The method according to claim 2, wherein the non-linear function is a Gaussian distribution function.

4. The method according to claim 2, wherein the distance corresponds to the square norm.

5. The method according to claim 1, wherein the two or more start positions are sample positions in a selected segment of an image,
    wherein the image includes a plurality of segments, and
    wherein the selected segment is a set of image samples, the set being smaller than the image.

6. The method according to claim 5, further comprising: reconstructing a motion vector field of the selected segment of the image, including estimating a motion vector starting at each position P(x,y) of the selected segment different from the two or more start positions.

7. The method according to claim 5, wherein:
the two or more start positions and the two or more motion vectors are obtained by parsing from a bitstream related to the selected segment of the image, and
weights applied in the weighted average are determined based on one or more parameters parsed from the bitstream.

8. The method according to claim 5, wherein:
the two or more start positions within the selected segment of the image are determined based on a feature of the selected segment decoded from a bitstream,
the two or more motion vectors are obtained by parsing from the bitstream related to the selected segment, and
weights applied in the weighted average are determined based on one or more parameters parsed from the bitstream.

9. The method according to claim 5, wherein:
the two or more start positions and the two or more motion vectors are obtained by determining a motion vector field including a motion vector for each sample target position of the selected segment of the image and by subsampling the obtained motion vector field, and/or
weights applied in the weighted average are determining by rate-distortion optimization or by machine learning.

10. A method for decoding of an image, the method comprising:
estimating a motion vector at a sample target position by using the method according to claim 1;
predicting a sample at the target position in the image according to the estimated motion vector and a corresponding reference picture; and
reconstructing the sample at the target position based on the prediction.

11. A method for encoding of an image, the method comprising:
estimating a motion vector at a target position by using the method according to claim 1;
predicting a sample at the target position in the image according to the estimated motion vector and a corresponding reference picture; and
encoding the sample at the target position based on the prediction.

12. An apparatus for estimating a motion vector at a target position, the apparatus comprising:
processing circuitry configured to:
obtain two or more start positions and two or more motion vectors, each respective motion vector of the two or more motion vectors starting from a respective one of the two or more start positions,
obtain, for each respective start position of the two or more start positions, a respective transformation corresponding to the respective start position, the respective transformation being configured to transform the respective motion vector starting at the respective start position to another respective start position, wherein
the processing circuitry is configured to obtain a respective transformation corresponding to a respective start position by:
obtaining a motion vector starting at the another respective start position; and
estimating parameters of an affine transformation based on an affine transforming of the motion vector starting at the respective start position to the motion vector starting at the another respective start position;
obtain two or more contributing motion vectors by determining, for each respective motion vector of the two or more motion vectors, a respective contributing motion vector by transforming the respective motion vector with the respective transformation corresponding to the respective start position of the motion vector, to a target position of the respective transformation; and
estimate the motion vector at the target position to provide an estimated motion vector, wherein estimating the motion vector includes determining a including weighted average of the two or more contributing motion vectors,
wherein the two or more start positions belong to a set of Ns start positions with Ns>2, ordered in a predefined order,
wherein, for a respective start position j, 0≤j≤Ns, the another respective position is a position j+1 in the predefined order, and
wherein a weight, in the weighted average, of a contributing vector depends on a position, within the predefined order, of a respective starting position of the respective transformed motion vector.

13. The apparatus for estimating a motion vector at a target position according to claim 12, wherein the processing circuitry includes:
a sample predictor configured to predict a sample at the target position in the image according to the estimated motion vector and a corresponding reference picture; and
a bitstream generator configured to encode the sample at the target position based on the prediction.

14. The apparatus for estimating a motion vector at a target position according to claim 12, wherein the processing circuitry includes:
a sample predictor configured to predict a sample at the target position in the image according to the estimated motion vector and a corresponding reference picture; and
a sample reconstructor configured to reconstruct the sample at the target position based on the prediction.

15. A computer program stored on a non-transitory computer readable medium, the computer program comprising instruction code that, when executed on one or more processors, causes the one or more processors to perform the method according to claim 1.

* * * * *

UNITED STATES PATENT AND TRADEMARK OFFICE
CERTIFICATE OF CORRECTION

PATENT NO. : 12,184,863 B2
APPLICATION NO. : 18/145569
DATED : December 31, 2024
INVENTOR(S) : Sychev et al.

Page 1 of 1

It is certified that error appears in the above-identified patent and that said Letters Patent is hereby corrected as shown below:

In the Claims

Claim 1: Column 36, Line 41: "another respective position is a position i+1 in the" should read as -- another respective position is a position j+1 in the --.

Signed and Sealed this
Seventeenth Day of June, 2025

Coke Morgan Stewart
*Acting Director of the United States Patent and Trademark Office*